US011361675B2

(12) United States Patent
Begert

(10) Patent No.: US 11,361,675 B2
(45) Date of Patent: Jun. 14, 2022

(54) SYSTEM AND METHOD FOR TEACHING A FOREIGN LANGUAGE UTILIZING INTERPRETATION PHRASES AND NEAR SIMULTANEOUS INTERPRETATION OF DIGITAL CHILDREN'S STORIES AND RELATED IMAGES

(71) Applicant: Magical Translations, Inc., Austin, TX (US)

(72) Inventor: Leslie Omana Begert, Austin, TX (US)

(73) Assignee: MAGICAL TRANSLATIONS, INC., Austin, TX (US)

( * ) Notice: Subject to any disclaimer, the term of this patent is extended or adjusted under 35 U.S.C. 154(b) by 574 days.

(21) Appl. No.: 16/183,342

(22) Filed: Nov. 7, 2018

(65) Prior Publication Data

US 2019/0189027 A1 Jun. 20, 2019

Related U.S. Application Data

(60) Provisional application No. 62/582,426, filed on Nov. 7, 2017.

(51) Int. Cl.
*G09B 19/06* (2006.01)
(52) U.S. Cl.
CPC .................. *G09B 19/06* (2013.01)
(58) Field of Classification Search
None
See application file for complete search history.

(56) References Cited

U.S. PATENT DOCUMENTS

| 2006/0111902 A1* | 5/2006 | Julia .................. G09B 5/06 704/236 |
| 2014/0120503 A1* | 5/2014 | Nicol .................. G09B 5/02 434/157 |
| 2014/0127653 A1* | 5/2014 | Link .................. G09B 19/06 434/157 |
| 2014/0272894 A1* | 9/2014 | Grimes .................. G09B 5/125 434/350 |

* cited by examiner

*Primary Examiner* — Bruk A Gebremichael
(74) *Attorney, Agent, or Firm* — Pillsbury Winthrop Shaw Pittman LLP

(57) ABSTRACT

Provided is a system and a non-transitory computer-readable medium having computer-executable instructions stored thereon which, when executed by one or more processors effectuate operations comprising dividing a text of a plurality of words in a foreign language into one or more Interpretation Phrases, each of the Interpretation Phrases being made of one or more words chosen at an optimal composition for a user to listen to, read along, and maintain comprehension and engagement, wherein the optimal composition is determined based on the biographical data of the user and the historical usage by the user; reading aloud the first Interpretation Phrase by a narrator; and after reading aloud the first Interpretation Phrase, interpreting aloud the first Interpretation Phrase into the said user's native language to provide understanding of the Interpretation Phrase in the user's native language, to maintain the flow of the story, and to create and promote subconscious associations between native and foreign language words.

20 Claims, 34 Drawing Sheets

| Foreign Language (FL): | Spanish (ES) | | |
|---|---|---|---|
| Native Language (NL): | English (EN) | | |
| FL Display Text: | DT1 | | |
| | Un caballo que se reía de espaldas. | | |
| FL Interpretation Phrase (IP©): | IP1 | IP2 | IP3 |
| | a. Un | c. que | f. de |
| | b. caballo | d. se | g. espaldas |
| | | e. reía | |
| NL Near Simultaneous Interpretation (NST©): | NST1 | NST2 | NST3 |
| | A horse | that laughed | on its back |

Figure 4

| Workflow Sequence | 1 | 2 | 3 | 4 | 5 | 6 | 7 | 8 | 9 | 10 | 11 |
|---|---|---|---|---|---|---|---|---|---|---|---|
| DISPLAY TEXT | DT1 | DT1 | DT1 | DT1 | DT1 | DT1 | DT1 | DT1 | DT1 | DT1 | DT1 |
| HIGHLIGHTED TEXT | | IP1a. | IP1a. + IP1b. | IP1a. + IP1b. | IP1c. | IP1c. + IP1d. | IP1c. + IP1d. + IP1e. | IP1c. + IP1d. + IP1e. | IP1f. | IP1f. + IP1g. | IP1f. + IP1g. |
| FL AUDIO | | IP1a. | IP1b. | | IP1c. | IP1d. | IP1e. | | IP1f. | IP1g. | |
| NL AUDIO | | | | NST1 | | | | NST2 | | | NST3 |
| | | | | | | | | | | | |
| ES Highlighted Text | | Un | Un caballo | Un caballo | que | que se | que se reía | | de | de espaldas | de espaldas |
| ES Audio | | Un | caballo | | que | se | reía | | de | espaldas | |
| EN Audio | | | | A Horse | | | | that laughed | | | on it's back. |

Figure 5

SYSTEM AND METHOD FOR TEACHING A FOREIGN LANGUAGE UTILIZING INTERPRETATION PHRASES AND NEAR SIMULTANEOUS INTERPRETATION OF DIGITAL CHILDREN'S STORIES AND RELATED IMAGES

CROSS REFERENCE TO RELATED APPLICATIONS

This application claims priority to U.S. Provisional Application 62/582,426, filed Nov. 7, 2017.

BACKGROUND OF THE INVENTION

1. Field of the Disclosure

The present disclosure generally relates to foreign language teaching aids, and is more specifically a system, media and method to help users, including young children, acquire a strong foundation in a foreign language through interactive, digital stories and related images.

2. Description of Related Art

In an increasingly multicultural and globalized world, parents and educators are realizing the need to provide their young children and students with the opportunity to learn a foreign language to best prepare them for the future.

There are well documented cognitive and academic benefits to learning a foreign language. Numerous academic papers and articles have been written verifying that acquiring a foreign language helps overall school performance, executive function for superior planning and problem-solving skills, focus and distraction minimization, creativity, cognitive flexibility (including grasping and reconciling conflicting ideas, multitasking and reasoning), and prevention of dementia.

Acquiring a relevant foreign language is an increasingly valuable skill to prepare for a multicultural work environment. In the United States, for example, the second language most parents and educators focus on is Spanish. Projected growth rate of Spanish language prevalence in the U.S. has implications on future work environments. As a result, Spanish language learning for children today will prove genuinely advantageous in a future work place. The United States is now the world's second largest Spanish-speaking country after Mexico with 41 million native Spanish Speakers and 11.6 million bilinguals. The U.S.'s Spanish-speaking population is greater than Colombia (48 million), Spain (46 million) and second only to Mexico (121 million). The US Census office estimates that the country will grow to 139 million Spanish speakers by 2050, making the United States the largest Spanish speaking nation in the world, with Spanish the mother tongue of almost ⅓ of its citizens. In certain large, populous, economically advanced states along the Mexican border, such as Texas and California, the demographic shifts are happening much faster and provide insight into how these trends will eventually affect the labor force across the US. According to estimates by the Texas State Data center, by 2020, Hispanics will make up the majority of the state's population and will grow to account for over 50% of all Texans by 2040, when they will also make up the majority of the labor force in the state. Most of this growth comes from the relatively young age of Hispanics today (in 2010 median age of Hispanics in Texas was 26.7 vs 40.9 in the White non-Hispanic population) and higher-than-average birth rates. This implies that the majority Spanish-speaking workforce in 2040 will have been largely raised in the US educational system and will therefore be employed in more white-collar jobs in the United States relative to today's participation.

Workplace dynamics, culture and productivity are challenged when over 50% of the workforce in any given office has the ability and/or desire to speak another language at any given point. Mono-lingual workers are at a distinct disadvantage and their job performance and level of social acceptance may suffer. Work-related conversations in informal settings are just as likely to occur in Spanish as in English. The mono-lingual worker will be less informed on all opportunities and situations in their work environment compared to their bi-lingual colleagues.

In addition, a monolingual employee may be less capable or inclined to socialize fluidly and authentically with all their mono and bi-lingual colleagues and therefore less able to form a full range of constructive and fruitful relationships across the workforce. Well-informed parents and educators that are aware of these rapidly changing demographics and the effects on the workforce realize that learning a second language will provide their children with a significant advantage as professional adults.

A multilingual society promotes intercultural awareness, empathy, increased tolerance and cooperation between people of different views and backgrounds. Communicating in a common language reduces social and professional friction, improves the possibility of a mutual understanding and fosters collaboration in the public and private sector as well as within and between communities. From an economic perspective, a multilingual workforce may enhance the economic competitiveness of that society.

Despite an increasingly competitive global market, the changing domestic demographics in the United States, and the documented benefits to cognitive capacity and career opportunities associated with speaking a second language, three quarters of public schools in the U.S. do not teach a second language, including many school districts in border states where the advantage is more pronounced. Private schools may offer young children foreign language instruction, but it is often for too brief a period of time each week which, in and of itself, is not enough to develop a strong foundation to learn a second language well. It is clear to many parents and educators that if they want their children to develop a meaningful capacity in a relevant, non-native language, then a solution must be found outside of school on their own time and with their own resources.

There are many methods of teaching foreign languages to adults. Traditionally, these have been grammar-based approaches, which require the conscious learning of grammatical rules and the repetitive drilling of vocabulary. Academic literature has shown that these approaches, though long prevalent in most learning institutions, are an ineffective way of learning a second language. Alternative approaches, based on the academic work of Stephen Krashen, yield other results. Krashen has a 5 hypothesis model about second language acquisition, briefly outlined here: First, the acquisition-learning distinction. There exist two distinct ways of becoming competent in a second language, through acquisition where you have developed a feeling for what is right and wrong in a language, which is typically how children master a second language or through learning where you have consciously learned the rules of a language, that is, the grammar and vocabulary, which is the typical manner adults in classroom settings master a second language. Second, the natural order hypothesis, which states that the rules of grammar are acquired in a certain order for a given language or population. Third, the monitor hypothesis, which states that conscious learning and any formal knowledge of the grammar of a second language only serves as an 'editor' to evaluate an utterance after it has been made but does not serve in producing the utterance. Fourth, the input hypothesis. The environment for successful acquisition comprises 'comprehensible input,' namely understanding input that is somewhat beyond the learner's current level of competence, having the learner initially listen and read prior to speaking, and having the learner address meaning prior to sentence structure. Fifth, the affective filter hypothesis, which states that no level of 'comprehensible input' will allow a person to learn a second language if that person is in a negative affective state, anxious, fear failure or ill at ease. The student needs to feel motivated, confident, positive and unconcerned.

A number of teaching methodologies for adults emerged from Krashen's work, including Total Physical Response ("TPR") Storytelling by James Asher. TPR focuses on the coordination of language and physical movement and the use of the imperative during the silent period preceding speech production. TPR has been further expanded on and translated into the classroom through the work of Ray Blaine. Of particular note in Asher's research is his assertion that it is no accident that listening precedes speaking. It may be that listening comprehension maps the blueprint for the future acquisition of speaking. Asher also hypothesizes that his more 'right brained' methodology lowers stress levels compared to traditional 'left brained' methodologies and therefore provide better affective conditions for language acquisition.

The Krashen-inspired teaching methodologies focus on adults as their target audience and on acting and/or movement to create the appropriate comprehensible input. Krashen's work can be narrowed and applied more specifically to helping children acquire a second language. Whilst the acting/movement approach would no doubt also work for children in a classroom setting with a teacher physically present, other strategies would also work equally well or better whilst still being in line with Krashen's principles. In particular, children's unique and time-tested interest in colorful picture books combined with the increasing ubiquity and affordability of easy-to-use technology mediums, such as touch screen mobile devices, creates an opportunity to introduce a new teaching methodology that would be in line with Krashen's hypotheses and yet would permit a teacher to be physically present as needed. As a result, this particular foreign language learning system and media would be available to many more children at a fraction of the cost.

Instead of using acting, movement and other kinesthetic comprehensible inputs, children will respond equally well or better to comprehensible inputs based on entertaining digital stories where listening and reading are the primary ingredients, and speaking follows when the child is ready. The very medium of color, pictures and stories leans on right brain processing which provides a positive affective filter and lowers anxiety levels and makes language acquisition more effective.

Below is the relevant art for instructional methodologies that aim to break out of and move beyond the traditional classroom grammar-based approaches that are ineffective in teaching a second language.

Quiroz (U.S. Pat. No. 6,736,641) has a patent for a system that claims to not require memorization, repetition or the use of grammar as the main way to teach the target language. It uses a portable learning aid called a "One-Page-Book", which is a single, two-sided page that has words in the native language on one side and the target language on the other side. When folded in a pre-determined way, the student follows the numerical sequence of the aid to be able to speak, read and write the target language with no additional use of textbooks. It is an improvement over very classical language teaching in that it prioritizes learning syntax over grammar, and claims to provide students with the ability to spontaneously create their own sentences to freely express their needs, wants and opinions thus keeping them engaged. It is a system for consciously learning a language, not one for picking it up and acquiring it as it has a complex numerical sequence to learn. This patent lacks many of the features and advantages of the present disclosure. Among them, there is no audio component to this method, and therefore lacks elements such as demonstration of correct pronunciation. The Quiroz patent states that in addition to using the tool the students need to expose themselves to the target language, be it native speakers, television, reading and so forth to make up for the fact that the absence of audio content.

Rolstone (U.S. Pat. No. 8,678,826) eschews a traditional grammatical approach to learning and has a patent which prescribes creating a stress-free environment and lowers a student's effective barrier to learning a foreign language. The patent is focused on audio visual materials such as movies, TV productions and filmed theater. These films are spliced into discrete thoughts, and through editing, the foreign language translation, written and audio, is affixed just after each native section. Descriptions are given as to how the film is slowed down enough to allow the space to create a combined native language and foreign language dialogue stream that is associated with the video. According to the reference, this allows the student to develop associations between the two language streams. This patent states it leverages the student's knowledge of a native language in order to teach the foreign language and purposefully works in that direction, from native to target language. It uses films in a native language that are then translated to a foreign language.

Among its disadvantages is that, contrary to the teachings of Rolstone, the natural conclusion of Krashen and Asher's extensive academic work is that language acquisition happens best and most naturally when the initial focus is explicitly on listening, reading and comprehension of the target language, not when it is focused on how one would translate the native language into a target language. The latter has the brain subconsciously and consciously focusing on production of the target language, not on listening and comprehension of the target language. It is therefore fails to create an environment that leads to more effective language acquisition and will produce less favorable results.

Sameth et al references (U.S. Pat. Nos. 5,882,202 and 5,697,789) are patents that step away from traditional teaching techniques. The patents present stories using a computer, wherein certain frames in the story have dialogue balloons in a foreign language and their corresponding translation into the student's native language. According to these references, the students are aided in their pronunciation with digitally represented animated lips that mimic speaking the words out loud in the foreign language. Watching how these lips move is claimed to help the student with the correct pronunciation. This focuses on learning, a conscious, intentional approach, as opposed to students who can more effectively acquire a language naturally and subconsciously.

Among the failures of the Sameth references is that children, especially children 6 years and younger, are still in what Maria Montessori described as their 'sensitive period for language acquisition' where they absorb vast amounts of knowledge and information about language in a subconscious way. Children will most successfully improve their pronunciation in a foreign language when they are directed to mimic, or 'copycat', what they hear. Being a 'copycat' is a concept that children understand well, recognizing that to copy is more than simple repetition and involves copying everything about what you hear, especially intonation, accent, attitude, and volume. When directed to 'copycat', children will make an effort to closely listen to the foreign language speech and to tap into all the various aspects of speech that create pronunciation, including subconsciously delving into what the tongue and throat do without explicit instructions or examples. These aspects are key to how words and phrases are pronounced. Correct pronunciation typically arises both from what the lips are doing and other aspects of the mouth, throat and vocal chords which are missing in the Sameth references' approach with digitally animated lips. This serves as a distraction to children that would otherwise benefit more naturally by listening deeply and mimicking pronunciation more closely when instructed to copycat.

Lemmons (U.S. Pat. No. 8,843,377) uses his background and expertise in music to develop a different approach to foreign language instruction and pronunciation that claims to use tonal and rhythm visualization components to allow a person to see their words as they attempt to speak a foreign language. The pronunciation feedback described is suboptimal and can frustrate or discourage children. This negative feedback risks making the student uneasy or in a mildly anxious state of fearing failure. This negative affective state drastically decreases the effectiveness of any language learning methodology in both adults and children. Children, however, are even more susceptible to process the negative feedback in such a way as to diminish the effectiveness of the teaching methodology. Per Maria Montessori's description of their sponge-like mind, children need to hear the correct pronunciation repeated naturally and in context. Gradually, children will attempt to pronounce the word or phrase themselves when they are comfortable doing so, and will thus eventually acquire the right pronunciation. Ongoing positive modelling and exposure is much more likely to be successful with children than negative feedback.

Zilberman (U.S. Pat. No. 6,341,958) presents a method in which the student simultaneously reads, listens to and repeats a prerecorded text in their native language. Then the translated foreign language text is presented, and the student listens to it first and then reads it out loud. Then they are asked to write down as many of the foreign language words as they can remember. Among the differences between this method and those of the present disclosure, this approach is adapted for a classroom where a teacher is leading the momentum and keeping the class engaged, but is not interesting enough to the child to be successful at home. The approach assumes a writing proficiency that is beyond young children and precludes them as students, despite being the optimum age, from acquiring a second language.

Chigrinsky et al. (U.S. Pat. No. 5,178,542) claims a type of book with pictures and words utilizing alternating transparent sheets that lay on top of the book pages such as to provide full phrase translation as opposed to word by word translation of the target text. Chigrinsky discloses that learning occurs by exposure to and appreciation of complete thoughts and speech patterns expressed in the flow of a language as it is often used. Chigrinsky proposes that it is helpful for the reader to have available a translation which can be easily referred to in a manner that would not overly disturb the thought process. This means that word-by-word translation is best replaced by a more free-form translation corresponding to entire expressions or phrases. Among the drawback of the Chigrinsky method, the disclosure discloses a written translation itself that is disruptive to the flow and focus on comprehending the target language, no matter the nature of the translation, literal or otherwise. In addition, the Chigrinsky patent has no audio or listening component.

Dohring et al. (U.S. Pat. No. 8,784,108) discloses computer-based language immersion teaching systems for children that include learning activities around the foreign language phonemes including songs, puzzles, art, games, books and poems. Immersion means that all the activities are in the target language for instruction, correction and encouragement. There, recordings of attempts to speak in the foreign language are required, where the child's pronunciation is compared to a native one. The Dohring method has a number of features differing or inferior to the present disclosure, including the drawback creating a negative affect and learning outcome as described in Krashen's 'Affective Filter Hypothesis'.

West et al. (U.S. Pat. No. 5,649,826) discloses a method of teaching a foreign language using a media series that is claimed to be made up of a series of lessons which sequentially contain increasing percentage of the target language, starting from about 15% target language vs. 85% native language in the lesson and growing over each lesson up to using 100% target language. This method is suggested to be particularly suitable for young children who cannot yet read. This progressive exposure to the target language is systematic and strategic such that it is claimed the meaning of the target language can be readily and intuitively understood and wherein no supervision is necessary. Among the failures of this method is that mixing use of the target language with the native language leads to muddled language use.

Liu (Pub. No. US2017/0098289) focuses on children learning a second language, and in particular, a pictograph-based language such as Mandarin Chinese. The Lui application is for a system that claims to take advantage of the mobile computing environments for displaying pictures and playing audios of words to learn to read and write a core vocabulary in one or more languages simultaneously. Once learners have learned this core vocabulary, they can put these words together in any of the languages in which they've learnt the vocabulary. Liu contends learners can thereby master more than one language, in reading and writing, in the least possible time. The Liu reference has drawbacks because, among other things, its focus on memorizing individual words is a conscious learning process, not a process of acquisition. As such its ultimate long-term effect on speech production will be limited. Bilingualism, or at least proficiency in a second language, requires significant exposure to the target second language through listening and reading, and a long silent period before speaking the target language begins.

Mathias et al. (Pub. No. 2015/0356887 A1) discloses an application that leverages the high potential for engagement that modern day touchscreens afford with their speakers, microphones and high definition visual displays. The application of the disclosure uses comic strips in the target or native language to show the target and native language translations in boxes at the bottom of the screen. The reference fails to provide the advantages presented herein because, among other reasons, it presents a distraction that prohibits natural language acquisition to display the native language in written format. The native language should figure in oral format, in the form of an interpretation of the target language. It is counterproductive to display the translated text which naturally becomes the child's focus. The child's mind should focus on listening to and reading the target language, which are the two basic steps to acquisition of a second language. If a child is given the more familiar option of reading her native language instead or as well, the child will take that option instead of focusing on reading the target language. By withholding a written translation into her native tongue, but providing an oral interpretation, they start to become increasingly, subconsciously, familiar with how to read that language over time.

Back (Pub. No. US 2010/190141 A1) discloses translation methods. One option is a literal translation, whereby every word is translated literally. This can be very confusing because most languages tend to have different rules of syntax, and the resulting order of the words sounds awkward and often nonsensical in the language to which they are translated. Other translations that focus exclusively on sounding good in the language to which they are translated are unhelpful in that it is unclear which parts of the target language correspond to the native language and associations are hard to build. The resulting methodology differs from the present disclosure and imports many disadvantages, including that it is complicated, and like the relevant art he describes, the Back reference does not appeal to an individual trying to learn a foreign language. It serves to expose the mechanics of the translation process from literal to functional translation, which may be of interest to those with a background in translation, but unlikely to be of interest or of help to children learning a foreign language. Back fails to deliver an interpretation of intuitive phrasing that is both intelligible in the native tongue and helps build associations between words in the target language and the native language.

Falcon et al (U.S. Pat. No. 6,632,094) discloses a method designed to aid and support young pre-readers and early readers to become proficient readers in their native language. The claimed improvement of the existing art lies in the fact that Falcon discloses audio that is custom-recorded, natural story telling speech and more accurately synchronized with the highlighting than was previously possible, and there is a visual trail created throughout the text by the passage of each word through one of three different types of typeface or highlighting method. Falcon states that the latter improvement is of great use to the pre-reader in that it helps them develop the five dimensions of reading readiness as outlined by Dr. Purcell-Gates upon which the Flacon disclosure work is grounded. Among the differences between this and the present disclosure is the fundamental difference that the Falcon references is not directed to foreign language acquisition.

Calabrese (Pub. No. US 2004/0015360 A1) discloses products and methods for providing education with a virtual book where the teaching method comprises a selection of native text and target language text. It requires having a combination of physical books to be manipulated separately from the cassettes/CDs with the corresponding read aloud audio. The differences and disadvantages of this method include the absence of focus on language acquisition.

With the recent proliferation of tablets and touch screens, children are gaining access to digital platforms that offer a source of entertainment and education for a large portion of the young population. With this development, there has been an explosion of art that features both a migration of children's physical books to their digital incarnations, and the creation of countless more stories exclusively made for this digital realm that can also be purchased in app stores (Apple, Android, Kindle). These children's book apps look and behave very much like a physical book and have engaging illustrations and story lines, and many of them are available in a long list of languages. For these, however, the point of having the story available in many languages is to increase the potential market for their stories by making them accessible to wider audiences around the whole world in their primary language. These ebooks lack the disclosure of the educational methods claimed herein.

SUMMARY

Some or all of the foregoing shortcomings and failings of the existing art can be resolved with the implementation of the described method. An embodiment of a system and method can provide people of any age, with particular focus on language learners from the ages of approximately three to eleven years old with quality, engaging exposure to a target foreign language through digital representation of children's stories and audio and video interactivity tailored to the user's proficiency level on a digital medium. In an embodiment, the system, media, and method is tailored to start the user (e.g., child) with listening and comprehension of stories through near simultaneous interpretation of the foreign language text on a phrase by phrase basis. In another embodiment, the system, media, and method allows the child to eventually read these foreign language stories out loud on their own. Most embodiments are intended to provide children with a strong foundation for successful foreign language acquisition.

Text is provided into a digital device and appropriately animated according to the teachings herein to display some or all of the words to be translated and pictorial associations with those words. Sentences are subdivided into interpretation phrases (IP), which can comprise one or more words, are scored for level of use in the user, and presented to the user at varying levels of difficulty. IPs are read aloud and displayed on the screen in some embodiments. In many embodiments, the native language translation is recited aloud without display of accompanying synchronized text. In some embodiments, some interaction with synchronized displayed images on the screen, such as the selection of the part of the image that corresponds to the foreign language IP, is required to continue through the language program and trigger the recitation of the native language portion.

In many embodiments, the IP is created by the segmenting of foreign language phrases. The IPs are developmentally appropriate for the user taking into considerations the user's biographic information, the user's historical performance, and syntactic and semantic considerations. IPs can be determined based on different factors, including mastery and engagement. Mastery can be long-term and academically based, while engagement can be more "in-the-moment" to capture things like whether the student is currently discouraged or whether the student is displaying a sharp increase in participation. Mastery can be based primarily on accuracy as well as general usage history, that is, what has this student been exposed to and how did they do on that. In some embodiments, speed plays a role in mastery, but can be less emphasized in a long-term context. Engagement, however, should be calculated more based on, for example, 1) speed of the last plurality of exercises, 2) how often the student is altering between exercise type, or session patterns like frequency of turning on the program or how long they are on it each time. In many embodiments, the optimized IP is selected based on algorithmic determinations of mastery and engagement.

An objective of at least one embodiment is to provide children from the ages of approximately three to eleven years old with quality, engaging exposure to a target foreign language through digital (or virtual) representation of children's stories. This example is tailored to start the child with listening and comprehension of these foreign language stories, and then move on to eventually reading the stories out loud on their own, thus giving them a foundation for successful foreign language acquisition. One objective is to allow the program to steer students towards the long-term goal of mastery while allowing for short-term deviations to be personalized based on current engagement. It would be equally accurate to phrase "long-term" and "short-term" as "global" and "local". Among other things, the disclosure improves upon existing foreign language teaching aids by incorporating interpretation phrases and near simultaneous interpretation into the system and method to engage the child and enhance listening, comprehension, reading and pronunciation of the foreign language. The disclosure is directed for use in children's stories on mobile digital platforms, but in other embodiments utilize other digital technology mediums such as online, augmented reality or virtual reality platforms.

BRIEF DESCRIPTION OF THE DRAWINGS

The foregoing aspects and advantages of the present disclosure will become more readily appreciated as the subject matter becomes better understood by reference to the following detailed description, when taken in conjunction with the accompanying drawings.

FIG. 4 is a legend for the schematic in FIG. 5.

FIG. 5 is a schematic diagram of an embodiment of the foreign language learning methodology applied to a digital children's story laying out the sequential methodology associated with utilization of the Interpretation Phrase (IP) with Near Simultaneous Interpretation (NSI) and highlighting.

Figure 1:
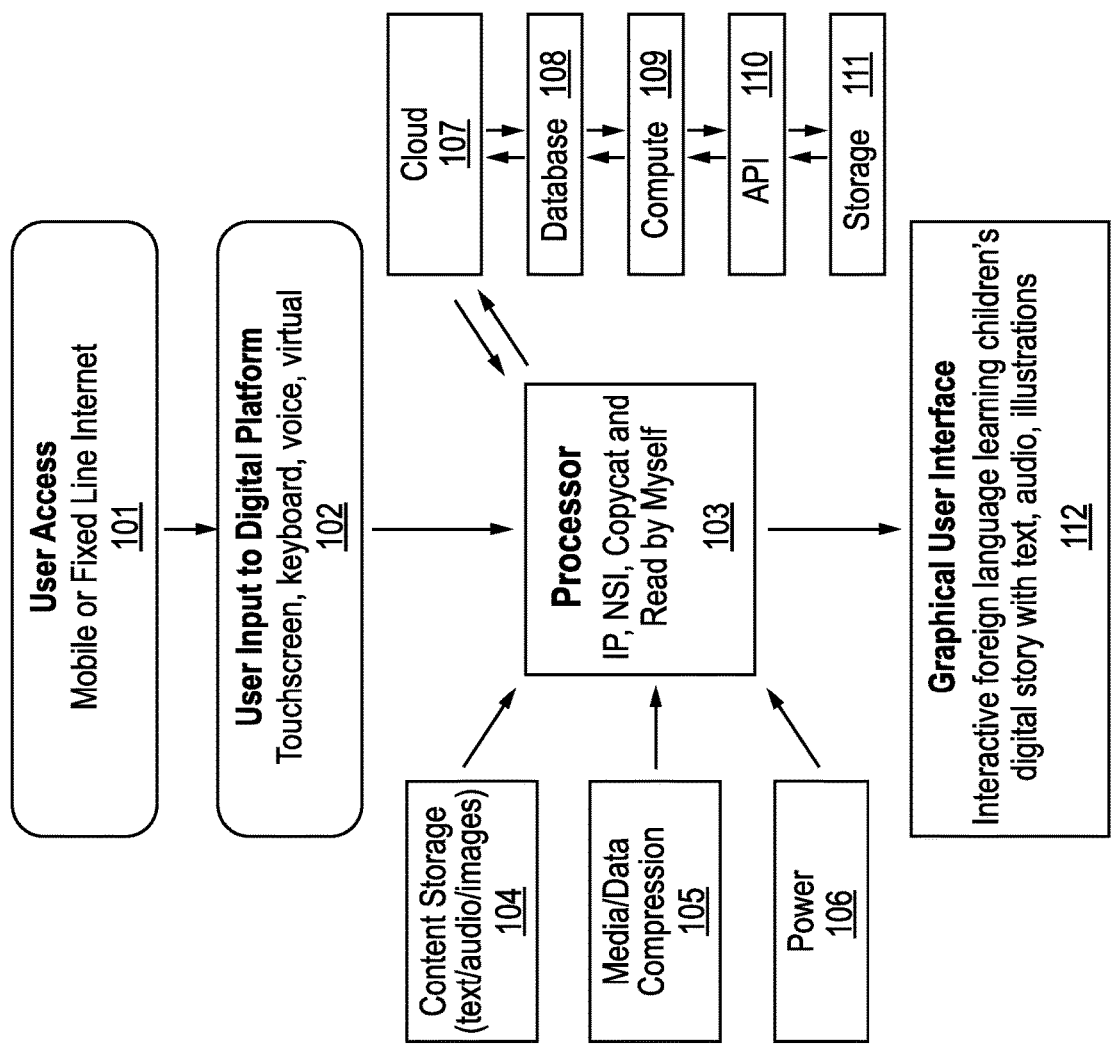
FIG. 1 is a block diagram of the basic computational system architecture for application of a system for foreign language learning in a digital processing environment.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

To mitigate the problems encountered in language learning as described herein, the inventors had to both invent solutions and, in some cases just as importantly, recognize problems overlooked (or not yet foreseen) by others in the fields of computerized language acquisition and teaching and computerized language processing. Indeed, the inventors wish to emphasize the difficulty of recognizing those problems that are nascent and will become much more apparent in the future should trends in the digital education industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments of the present disclosure include the reception, processing, and display of animated text and accompanying animated illustrations on digital computing devices, including mobile digital computing devices. In various embodiments a user sees text and hears foreign language audio and hears native language audio. Accompanying the audio can be interactive or non-interactive video or illustrations, including illustrations that demonstrate the scenes described in the text.

Throughout this specification English is used as the native language for the learner and Spanish for the target language or foreign language. It will be understood that the teachings herein are applicable to any native and foreign languages. Throughout this specification, the description of the user is as a child, but it will be understood that the techniques taught herein are applicable to users of all age.

In various embodiments, stories contain illustrations with various levels of animation, and the text is written in the foreign language. As the child digitally selects the next subsection, e.g., initiates animation to mimic turning the page of a digital text, the text is read out loud by a narrator in the foreign language, with an interpretation into the native language by the same or different narrator. In one embodiment of the product, this different 'interpreting narrator' may be cast as an animated figure such as an interpreter fairy or similar character who is animated or audibly sounds to appear to magically whisper the interpretation to the user (e.g., child). It is worth noting here that albeit the words 'interpretation' and 'translation' are colloquially used interchangeably, they are in fact not synonyms. 'Interpretation' is what happens when the source material, text or oral, is converted into another language orally, or by sign language, and 'Translation' is what happens when the source, recorded, oral, sign or text, is converted to another language in text. In at least one embodiment is the fact that unlike much relevant art, there is no use of translation into the native language. In this embodiment, there is only use of interpretation. In other words, native language text never appears in the stories in this embodiment, since it acts as a distraction to the child, and she/he would end up reading the easier/known text (i.e., the native language) instead of the more challenging text (i.e., the target or foreign text) in order to follow the story. The fact that the foreign language text appears provides a more immersive reading experience and creates an environment more likely to lead to acquisition rather than learning.

The Interpretation that is used in certain embodiments of the system and method disclosed herein is Near Simultaneous Interpretation (NSI). The embodiments of NSI described herein are devised to produce one or more of the following benefits: (i) provide immediate understanding of the target content in the native language (so as to be a frustration-free experience and keep the child engaged), (ii) create and promote subconscious associations between native and target language words which will sometimes require the use of a more awkward interpretations so that associations between the native and target words are clear and foster subconscious language acquisition, (iii) maintain a substantially uninterrupted flow of the story to a child who tends to have a shorter attention span than adults and are therefore less tolerant to interruptions in a narrative.

In some embodiments, NSI is achieved by creating the optimum length Interpretation Phrase (IP) for young language learners. In other embodiments, NSI is achieved by creating the optimum composition of words for each IP. In other embodiments, NSI is achieved by creating optimum segmentation of a text into IPs. An IP is the unit of interpretation in this disclosure, the grouping of words that will be interpreted and read by the narrator on a phrase by phrase basis according to a combination of grammatical construct and length. If the IP is too short or of imperfect composition of words or overly segmented, then the overall resulting interpretation is disjointed and is interpreted as choppy that disrupts the smooth flow of the story, losing the child's interest. If the IP is too long, overly wordy or made of text that is segmented at a level that combines too many dissimilar or unrelated concepts or words, then the associations between words become unclear, and the language 'acquisition' process is thwarted such that the child switches off during the longer 'tracts' of the foreign language. Under the techniques of this disclosure, suboptimal IP construction is avoided. As the reader's foreign language level increases, IPs can and do become longer or have more sophisticated or more difficult composition. By way of example, the following sentences form the text on one page of a children's story: "El perro negro se fue a la playa. Alli vio una ballena azul."

In existing art, after toggling from Spanish to the native language, both sentences would be translated in one continuous audio stream because it is on a single page (and the translation would then be read out loud). For a beginner, this approach would not produce any constructive associations between the foreign and native words because the IP would be too long.

In the opposite extreme, the IPs would be too short, for example, if every single word were to be individually read in Spanish and then individually interpreted into English, one word at a time. This would not only be very boring and interrupting the flow, but the meaning would actually be unclear as a literal translation.

However, using the techniques taught herein, including NSI, in certain embodiments there would be five IPs for beginner readers in the above text. (i) El perro negro, the black dog; (ii) se fue, went; (iii) a la playa, to the beach; (iv) Alli vio, there he saw; (v) una ballena azul, a blue whale.

NSI has the optimal length of IPs for a given level and/or reader. With NSI, the meaning is retained, the story is followed and the child begins to construct tentative mental associations. In some embodiments, the computing device executes an algorithm that accepts a text (e.g., sentence) in the target language with no initial segmentations. In this embodiment, the algorithm comprises a scoring algorithm, which examines all possible subdivisions of the sentence from single words to the entire sentence and scores each according to the ability level required to understand that IP in isolation. The scoring algorithm logically compares the results of the scores of different IP composition with the present level of the user. The algorithm further comprises a selection algorithm. The selection algorithm examines all possible combinations of subdivisions and selects the combination whose difficulty score (e.g., average difficulty) is nearest or otherwise most appropriate for the learner's algorithmically determined level, based on e.g., demonstrated ability, perceived ability, and engagement level. In certain embodiments, as the engagement level increases, the algorithm will select as appropriate the more difficult IP length than would be utilized based on the demonstrated and perceived ability alone. In other circumstances, the algorithm can determine whether the user's engagement suggests the user is not being challenged enough or whether they are becoming fatigued and need a few easier problems. Accordingly, the result of the algorithm on the input text is that different IP lengths (or IPs of different composition resulting in different difficulty) are chosen to match the user's score related to the user's foreign language ability.

Difficulty of IP length can be reduced to numerical scoring in certain embodiments. A foreign text (e.g., a sentence) without segmentation can be inputted and processed by a processor. A corresponding native language translation can be input into the program under the teachings of the present disclosure. The text in the foreign language can be divided into multiple pluralities of IPs of varying length or varying compositions corresponding to varying difficulty levels. The difficulty level of any particular text divided into IPs corresponds to scorings based on the presence and absence of cognates, the number of words in an IP, the grammatical difficulty of the candidate IP, the grammatical complexity of the sentence. In some embodiments, other criteria is taken into account when calculating difficulty, including the specifics of the language, the use of homographs or homonyms, the phrase types, the simplicity or complexity of the vocabulary, or otherwise. In this embodiment, the algorithm can produce each of the plurality of IPs and by scoring ranks the various of the pluralities of IPs in degree of difficulty that can be assigned to a user with the appropriate difficulty level.

The optimal length or composition of IPs or segmentation of text for NSI can vary in different embodiments. IP length can be optimized interactively by evaluating and using certain data from the user when using the program. For instance, IPs can be lengthened or shortened (or otherwise changed in composition) based on end-of-unit tests. In this regard, the length of the IP is understood to mean the various IPs that can be chosen by text segmentation, by word count, by common composition, or otherwise. In many embodiments, while not strictly limited to a determination of length, the two concepts are frequently and closely related. For example, an IP optimized for a more novice level learner will frequently, but not necessarily, be shorter than an IP optimized for a more advanced learner. Similarly, an IP optimized for a less engaged learner will frequently, but not necessarily, be shorter than an IP optimized for a more advanced learner. In this regard, the length of the IP is an approximate stand-in for the optimized IP length for different skill levels, taking into account the various factors for optimization. After the end of a unit, the program can ask questions in certain embodiments designed to determine a level of understanding of the material: e.g., What does "el perro negro" mean? Or the program can have interactive games, e.g., "Help 'el perro negro' get back to his house," which solicits user activity with accompanying animation that puts the meaning of 'el perro negro' in question. There, the response by the child indicates the child's understanding of the term. In some embodiments the level of success at these tests indicates whether to shorten, lengthen, or keep the IPs the same length; that is, whether to adjust the IPs to a level more suitable for a more advanced or less advanced level. In some embodiments, units can track the speed of a user as the child goes through a unit. If the speed is too low or too high, IPs may need to be adjusted, because excessive speed may indicate a lack of attention and the child's desire to get to the next phase, and too low may indicate a level of difficulty of IPs beyond what a child can do. In some embodiments, user speed can be tracked by eye movement over a page, through e.g., repeating the same IPs multiple times. In some embodiments, under the teachings herein, a camera or other input device can be utilized to determine eye movement. Similarly, in-unit grading can occur, where a unit requires interactivity as the words are read, the number of errors, error rate, or other suitable indicia for determining understanding, can indicate whether the optimal IP has been identified. In some embodiments, the program can track the amount of time a user spends using the program entirely without breaks or without closing the program. In those embodiments, if the frequency or number of breaks is too high or the length of use of the program is too short, it may indicate that the program is not holding the user's interest and the IPs are too short or too long.

An algorithm to determine whether the IPs are of optimal length can include one or more of these tests. In some embodiments, the algorithm can determine the number of words in an IP. An IP has a relation to the words in the sentence based on the usage of the words in a sentence. In some embodiments, adjectives and adverbs can be grouped in an IP with their described noun and verb. In some embodiments, articles can be groups with their described noun. In some embodiments, subjects can be an IP and objects can be an IP. In some embodiments, an IP can be a single word. In some embodiments a clause or a phrase can be an IP. In some embodiments, an adjective phrase can be an IP. In some embodiments, a noun phrase can be an IP. In some embodiments, prepositional phrases can be IPs. In some embodiments, IPs can be determined based on punctuation, e.g., based on divisions caused by commas and semicolons. In some embodiments, IPs are created based on the existence of cognates. In some embodiments, any combination of the foregoing can be an IP and any grouping of words can be an IP. It will be understood that the purpose of an IP is to group the words in cognizable set, with longer IPs to be used for cases of greater mastery and engagement with the material and the foreign language. Alternatively, the algorithm can group words into varying lengths depending on their usage in the foreign language sentence or the native language sentence. In most embodiments, IPs are predetermined for a particular sentence for various difficulties. Of the typical text to be translated and used with the teachings here, approximately 3 to 5 phrase constructs per sentence based on the grammar of content, focused on teaching to 3 to 10-year-olds. In these embodiments, the various IPs are pre-recorded for each construct, and the appropriate IPs with the corresponding recordings will be selected for use from the mapping of algorithm based on the above described algorithm. In some embodiments, the algorithm is calculated and the appropriate IP length is determined. In cases where the text is divided into three separate IP groups, the algorithmic scoring with divide the possible scores into groups of three: if the algorithmic scoring is in the lower third, the shortest IPs are used, if the scoring is in the middle third, the medium IPs are used, if the scoring is in the upper third, the longest IPs are used. A similar algorithmic scoring grouping is used for each of the different IP-length constructs for a given sentence.

In some embodiments, the determination of the IP is algorithmic. In some embodiments, the algorithm can be based on one or more of mastery, engagement, speed, age, other demographic factors, ease of material, and proficiency. An objective in the method and system of this disclosure is mastery, based on long-term and academically based understanding. Engagement is determined in short time frames, and designed to capture whether the student is currently discouraged or whether the student has a sudden spike in quality of work. A strong benefit under the teachings of this disclosure is being sensitive to a user's short-term engagement, allowing near real time ability to maintain, or correct toward, a positive effect on engagement and therefore mastery. Mastery, therefore, is based primarily on accuracy as well as general usage history; that is, what has this student been exposed to and how did they do on that. In some embodiments is the option to work and analyze in copycat recording information. In some embodiments, speed plays a role in mastery, and it can be less emphasized in a long-term context. In some embodiments, engagement should be calculated more based on, for example, 1) speed of the last n exercises, where n can vary based on the specifics of the program or is a set rolling value, 2) how often the student is changing between exercise type, or 3) session patterns like frequency of turning on the program and how long the student is on it each time. In some embodiments, these factors are used to carry out a primary objective, which is to allow the program to steer students towards the long-term goal of mastery while allowing for short-term deviations to be personalized based on current engagement. Some embodiments include an IP-determining algorithm that takes in a complete sentence and produces the IPs based on a difficulty score. In some embodiments, the algorithm maps from difficulty score to mastery and engagement scores. Under the teachings of this disclosures, the system will be able to programmatically examine all possible IPs and opt for the appropriate ones based on the material, historic use, and demographic profile of the user.

In some embodiments, if the algorithm determines the IPs are too long, the text of the subsequent portion or a repeat of the same portion of the program is divided into shorter IPs or otherwise different IPs with makeups of a lower difficulty level. In this manner, the program can change between appropriate difficulty levels dynamically. If the algorithm determines IPs are too short or of too low a difficulty level, the text of the subsequent portion or a repeat of the same portion of the program is divided into longer IPs or IPs of a higher difficulty level. By example, in some embodiments an algorithm to determine the correct length would begin with dividing the text into a predetermined IP length. As the user progresses through the program with NSI, the algorithm tests whether the user is progressing through at an appropriate speed, then the algorithm tests whether the user's error rate is below an acceptable threshold, then the algorithm tests the error rate at the end-of-unit tests, then the algorithm tests the historical use of the program to determine whether the user closes the program too quickly.

If the algorithm determines that one or more characteristics exist that indicate that IPs are not the correct length, either too long or too short, then the algorithm divides the subsequently used portion of text into longer or shorter IPs, as appropriate, for use in the subsequent use of the program.

The process of learning another language through NSI means the child is not given the meaning of each word, but that they deduce or figure out meaning through exposure and context association. NSI allows them to make subconscious hypotheses of word meanings that are constantly adjusted as new NSIs are processed in upcoming pages or stories.

For example, when seeing and hearing 'El perro negro', and then hearing 'the black dog' interpretation immediately, the child subconsciously posits that one of those words must mean 'dog'. When a few pages later the child hears 'El perro se sento' and then immediately hears the interpretation 'The dog sat down', he will start to make a subconscious hypothesis that 'perro' may mean 'dog'. This constant, active formation and testing of hypotheses of meaning is how language is acquired and leads to much higher retention rates than straightforward memorization as taught in a more traditional learning environment. This process means that the child is much more likely to retain the concepts than if they were given the answers.

In some embodiments, the native language interpretation would be spoken, not written. In this manner the child's eyes are trained on the foreign language text, and over time the child will develop a familiarity with how those initially unfamiliar words are sounded out in the foreign language, which eventually translates into learning how to read in the foreign language in a natural, stress-free state. This embodiment starts the child with stress-free listening and comprehension and eventually grows into reading. Listening, comprehension and reading combined allow for a strong second language foundation to be acquired and production of speech to eventually and naturally follow.

In some embodiments, as the narrator reads a given IP in the foreign language, each word is sequentially highlighted as it is read aloud and remains highlighted as the next word in the IP is read, so that gradually the whole IP becomes highlighted. When the foreign language narrator reaches the end of the IP, then the interpretation of the whole IP is provided virtually immediately thereafter, e.g., within a second or less or within time for fluid translation. During the interpretation, that IP remains in the highlighted state, indicating that the specific highlighted foreign language phrase is what is currently being interpreted in the native language. At the end of the interpretation, all highlighting is switched off and the narrator begins to read the next IP in the foreign language, and highlighting of that IP begins. The process is continued through the length of the text.

In some embodiments, the illustrations on each page are interactive. By example, the student can touch the dog and it barks, or it wags its tail, and the narrator says 'perro', and then the interpretation follows with 'dog'.

In certain embodiments, if the child touches the shown text of an individual word, that word can be (i) sounded out syllable by syllable in the foreign language, with each syllable being highlighted as it is read out loud (in a similar highlighting methodology to when the words within an IP are highlighted, keeping the previous syllable highlighted as you move along the word, so that by the end the whole word is highlighted). 'Pe' 'rro'→'Pe' 'rro'; (ii) Read out loud as a single word in the foreign language. 'Perro' and/or (iii) Interpretation of that word is given. 'Dog' (either by the Magic Translator Fairy or by narrator or otherwise, depending on the embodiment).

In various embodiments comprehension games are available at the end of each story. There are a number of games specifically related to that story, each available after a new re-reading of the story (e.g., vocabulary matching game, gender assignment game, for more advanced levels 'find the infinitive' etc.). The child gains a number of points per game successfully completed and per reading of the story.

In certain embodiments, once a child has read a number of stories, she/he may be ready to start the 'copycat recordings'. In the preferred embodiment, before copycat recordings are enabled, she must have read the story in its entirety as least once to ensure comprehension has been established. In certain embodiments settings can be adjusted by parents so that, for example, copycat recordings are only available after three read-throughs of a story. In the copycat mode there is no interpretation available, only the foreign language reading, one IP at a time, in a slightly slower pace than it was in the original read through. The child is instructed to be a copycat of the narrator, to imitate their tone of voice, volume, accent, everything. In these embodiments, she is told not to worry about meaning, but just mimic everything the narrator says exactly, regardless of whether she understands what he's saying.

Once she has done a certain number of copycats of a given story (in various embodiments, the minimum number can be changed by the parents in 'settings') then she can make a recording of her voice alongside the narrator to play back and listen to. The more copycat recordings she makes of a story, the more points she gets. In this manner, the student can practice and obtain feedback regarding the quality of the foreign language diction.

In some embodiments, once the child has made a minimum number of copycat recordings, she is ready, should she wish, to make her own 'Read by Myself' ("RBM") recording where she reads the entire story, highlighted phrase by phrase, on her own with no modelling by the narrator. The minimum number can be adjusted by parent in the settings. In this manner, the device can impart a sense of great achievement and positive reinforcement of her progress in reading a foreign language, which emboldens the child. This recording is something they are encouraged to share with their family, friends and teachers. Responses on these 'shares' from said family members and teachers are stored along with the story and recordings in their personal digital library, so that the child can see encouragement, congratulations and helpful tips from those that care about them and their efforts. Points are given for each RBM recording.

In some embodiments, the student's family can be assigned an account, assigned to one subscribing adult, and each student creates a user profile that must be used to log in to open stories in their family's library. In this manner, the individual progress made by each child can be monitored separately, and the appropriate amount of points tallied up. The points serve within a larger game associated with achievement.

In some embodiments, settings can be altered for each child by the parent. They would be set at a 'default' recommended settings for the average beginner, but the parents would be made aware that the settings can be tailored to their children as they adapt to the program and according to the child's disposition. The idea is that each parent knows their child, and that the most important thing is for the child to remain engaged, to show up and listen to stories in that foreign language again and again. The more the child shows up to listen and eventually to read, the greater the achievement. The parent, or teacher/instructor, will have the option to access usage analysis and insight into their child's usage patterns in order to course correct or encourage recommended use and process.

With respect to FIG. 1, the following make up the computational system architecture. A user decides to gain access to the system either via the mobile internet or the fixed line internet 101. A user decides to input commands by touchscreen, keyboard, voice or virtual platform to digitally access the system 102. The processor 103 receives input from stored content 104, media data compression 105, and is powered by power supply 106. Computational processing, storage, and API need not be locally hosted and can be cloud-based, as shown with inputs from cloud-based services and applications 107 such as database management 108, computational resources 109, external Application Program Interfaces (API) 110 and block storage 111 to process the Interpretation Phrases, Near Simultaneous Interpretation, Copycat and Read by Myself functions of the system and produce the interactive foreign language learning digital children's story for display on the graphical user interface 112.

Figure 2:
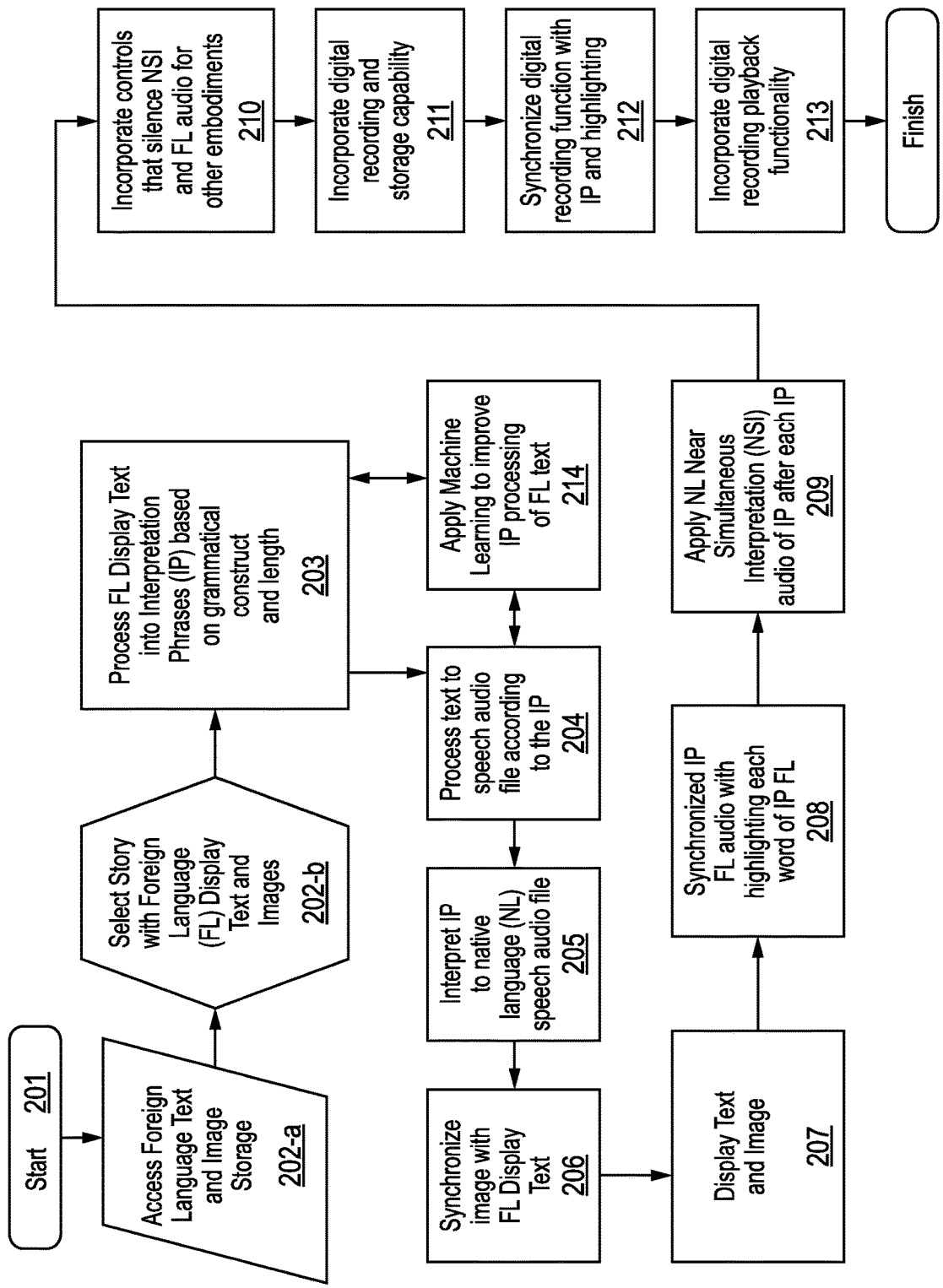
FIG. 2 is a flow diagram illustrating the steps taken by a program developer to create an embodiment of the foreign language learning methodology utilizing interpretation phrases and near simultaneous interpretation of digital children's stories and related images.

FIG. 2 is a flow diagram illustrating the steps taken by a program developer to create an embodiment of the foreign language learning methodology utilizing interpretation phrases and near simultaneous interpretation of digital children's stories and related images. The program starts 201 and the user accesses the foreign language text and the image storage that corresponds 202a. The corresponding foreign language (FL) selects and displays the corresponding text and images 202b. The program processes the FL text into interpretation phrases 203. The audio file corresponding to the FL text is chosen 204. The Interpretive Phrase (IP) is interpreted to the native language text and appropriate audio file 205. The image and FL display text is synchronized 206. The text and image is displayed 207. The FL IP audio is synchronized with highlighting and the IP is highlighted as the audio file is read aloud 208. Near Simultaneous Interpretation audio of FL IP is said aloud after FL IP 209. Other embodiments as appropriate remove NSI audio and FL audio 210. Other embodiments utilize digital recording and storage capability, for instance, of the user's attempts at pronunciation 211. Other embodiments utilize synchronization with digital recording and highlighting IPs 212. Other embodiments incorporate digital recording playback functionality 213. During the process, iterative learning processes improve IP processing, adjusting size and speed as appropriate 214.

Figure 3:
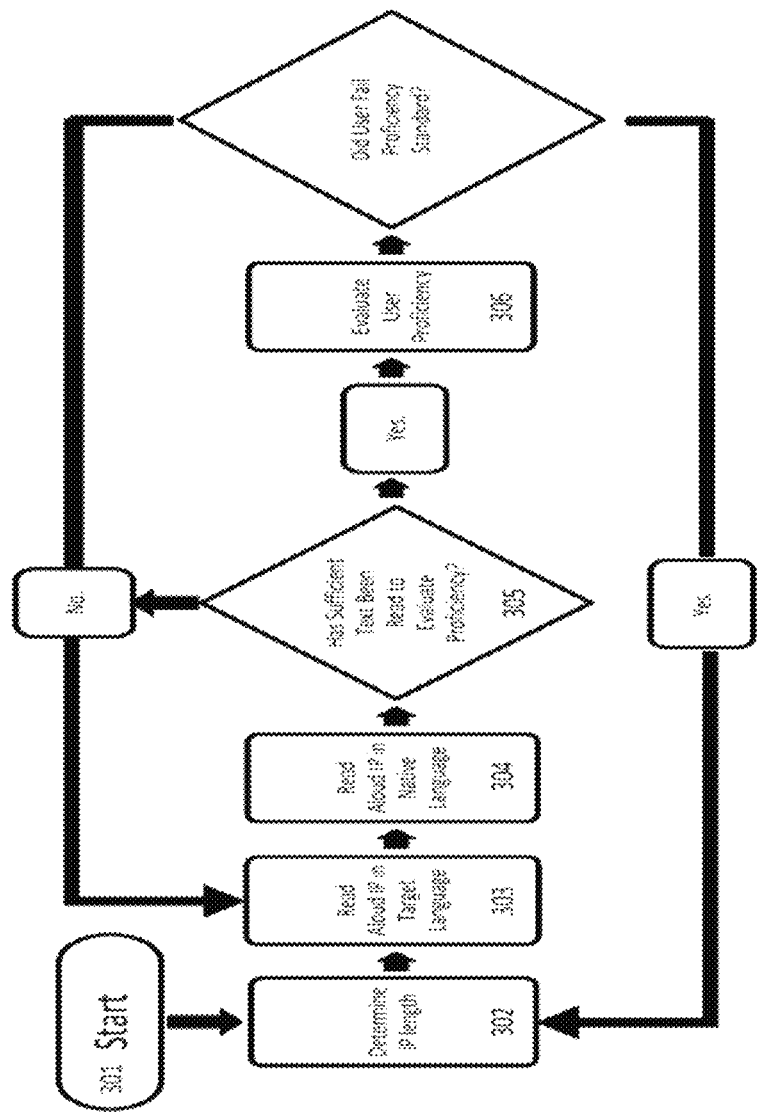
FIG. 3 shows the iterative process by which feedback from the user allows the program to continually optimize Interpretive Phrases (IPs).

FIG. 3 shows the iterative process by which interpretive phrases can be designed. The program starts 301. It determines an appropriate IP length based on predetermined or default criteria 302. In the various embodiments, the foreign language IP is transmitted to the user. Here, it is read aloud 303. In the various embodiments, the native language IP is transmitted to the user. As shown, it is read aloud in the native language 304. If a sufficient amount of the program has been completed such that proficiency can be evaluated and the present IP length can be evaluated 305, the program evaluates proficiency of the user, by the various methods disclosed herein, e.g., by speed, accuracy, sophistication of materials, biometric feedback or otherwise. If an insufficient amount of the program has been completed such that proficiency can be evaluated or the present IP length or composition can be evaluated, the process of reading and translating IPs resumes with the subsequent text until a sufficient amount has been read or the text is completed. If the evaluation occurs, the program determines if the user has failed to demonstrate sufficient proficiency 306. If the user fails to demonstrate sufficient proficiency, the size or compositions of the subsequent IP is altered according to the disclosure herein, e.g., through the optimization of IP process disclosed herein, and the process is repeated by reading aloud the now-optimized IP and translating the same. If the user has demonstrated continued proficiency, the IP remains the same. Of course, other embodiments would allow for other forms of evaluation, frequency of evaluation, and modification of IPs.

Figure 6:
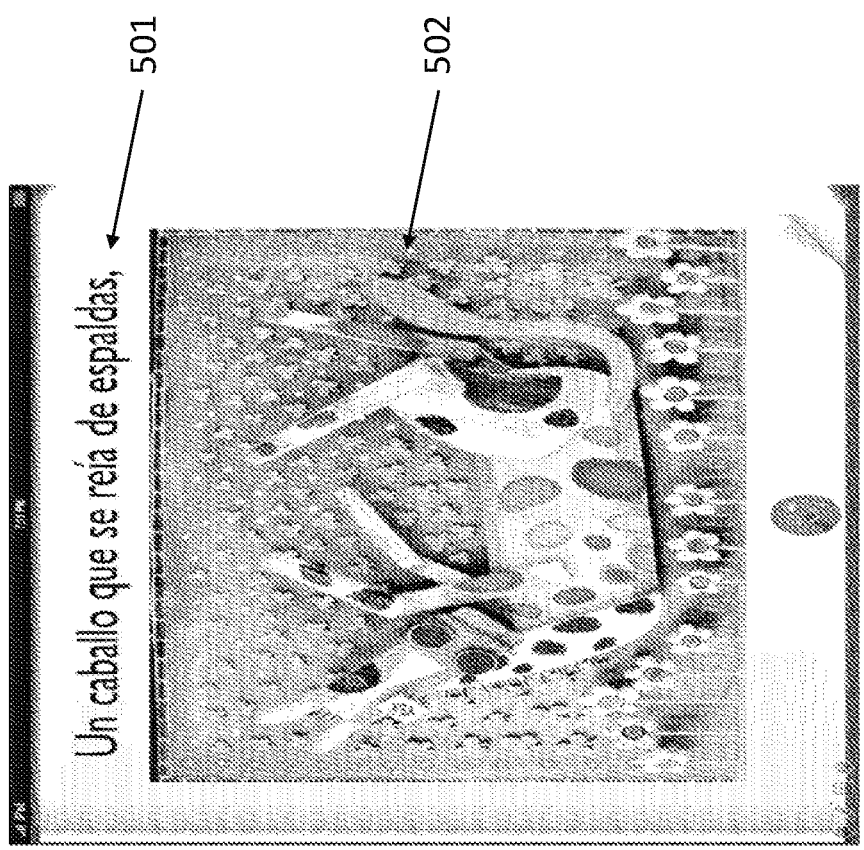
FIG. 6 shows the first step of progress of an embodiment of the sequential learning process applied to a digital children's story utilizing Interpretation Phrase (IP) with iterations under Near Simultaneous Interpretation (NSI).
Figure 7:
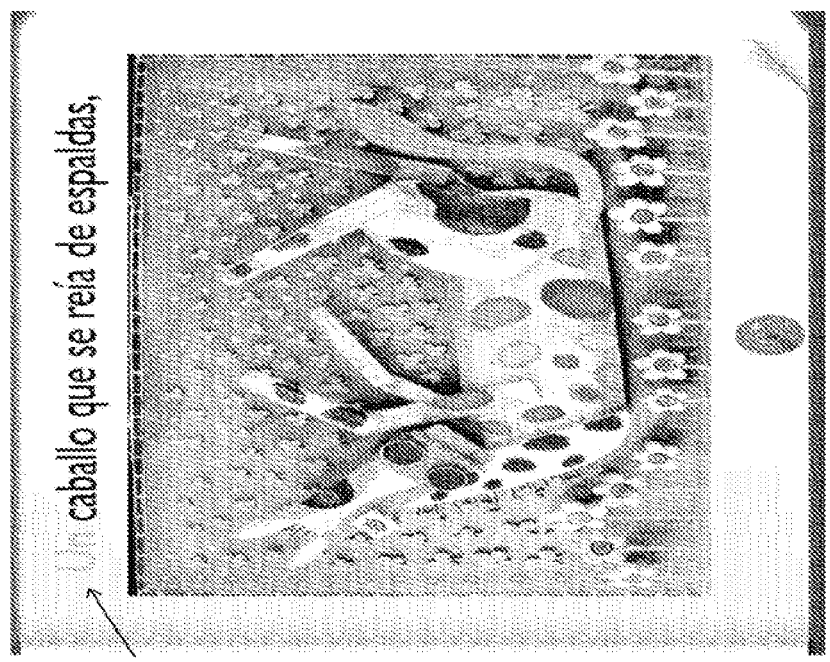
FIG. 7 shows the second step of progress of an embodiment of the sequential learning process applied to a digital children's story utilizing IP with iterations under NSI.
Figure 8:
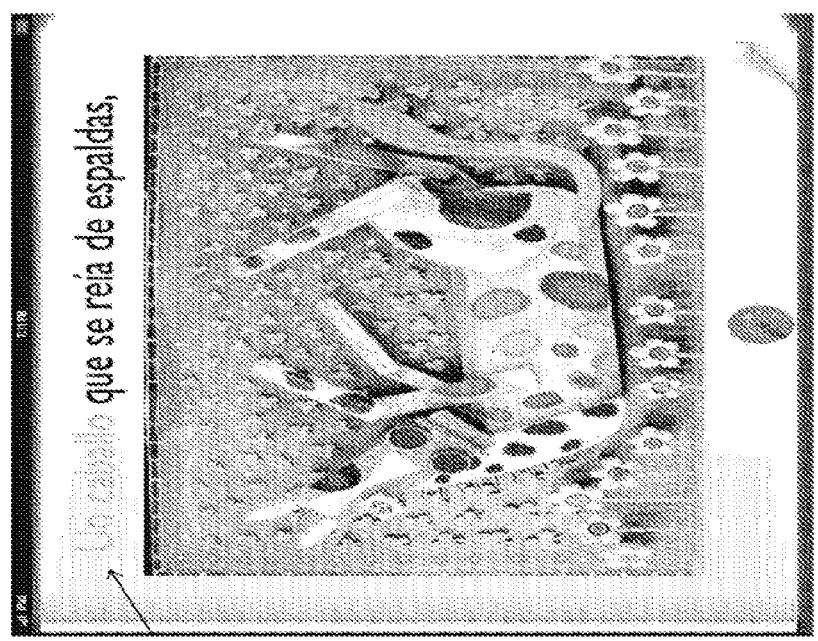
FIG. 8 shows the third step of progress of an embodiment of the sequential learning process applied to a digital children's story utilizing IP with iterations under NSI.
Figure 9:
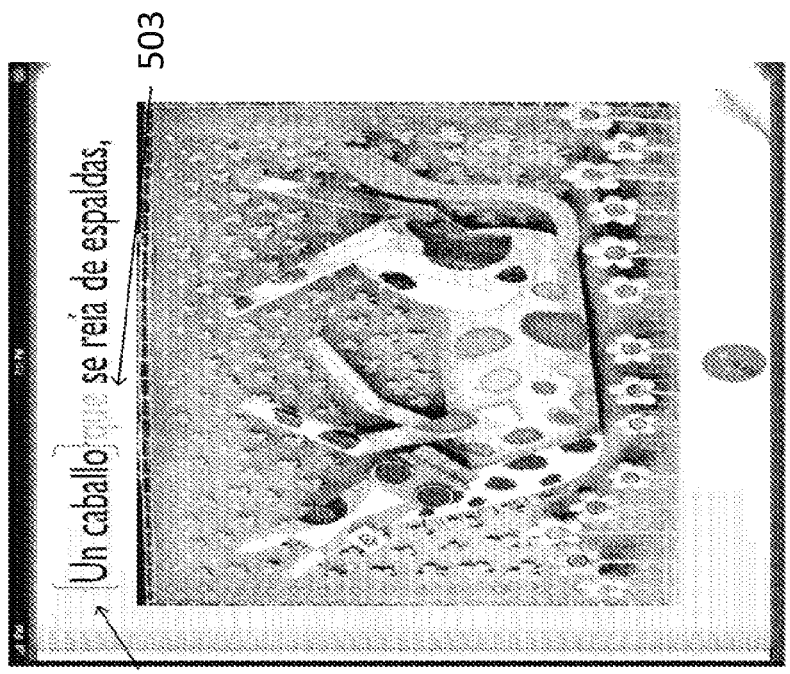
FIG. 9 shows the fourth step of progress of an embodiment of the sequential learning process applied to a digital children's story utilizing IP with iterations under NSI.

With respect to FIG. 6-32, the sequence shows the process under different methods and a display shown in various embodiments. Initially as in FIG. 6, the initial display text 501 with image 502 is shown. Next as in FIG. 7, IP begins. Each word of IP is highlighted 503 sequentially and synchronized with foreign language audio. In FIG. 8, each sequential word of IP remains highlighted 503 until end of the IP and synchronized foreign language audio. Immediately after end of the IP, NSI audio of the IP in native language is played. In FIG. 9, it shows that new IP begins, and each word of IP is highlighted sequentially and synchronized with foreign language audio. The previous IP is no longer highlighted 504.

Figure 10:
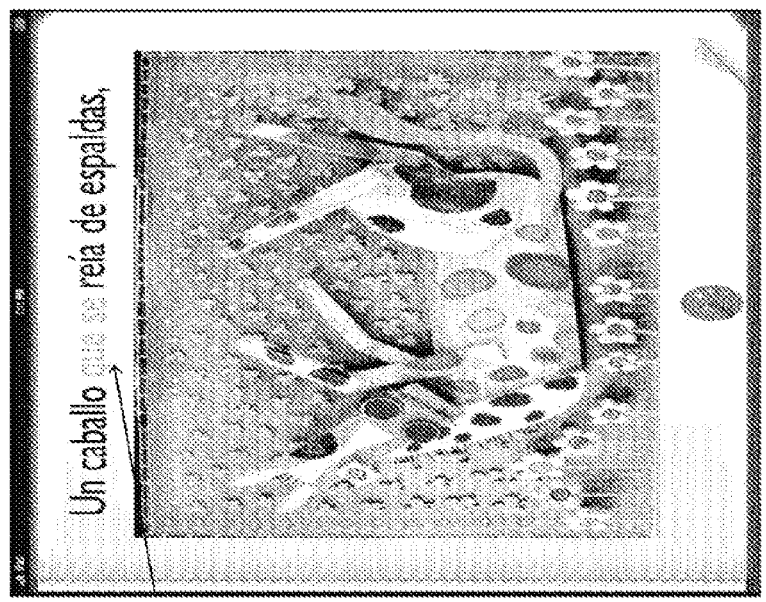
FIG. 10 shows the fifth step of progress of an embodiment of the sequential learning process applied to a digital children's story utilizing IP with iterations under NSI.
Figure 11:
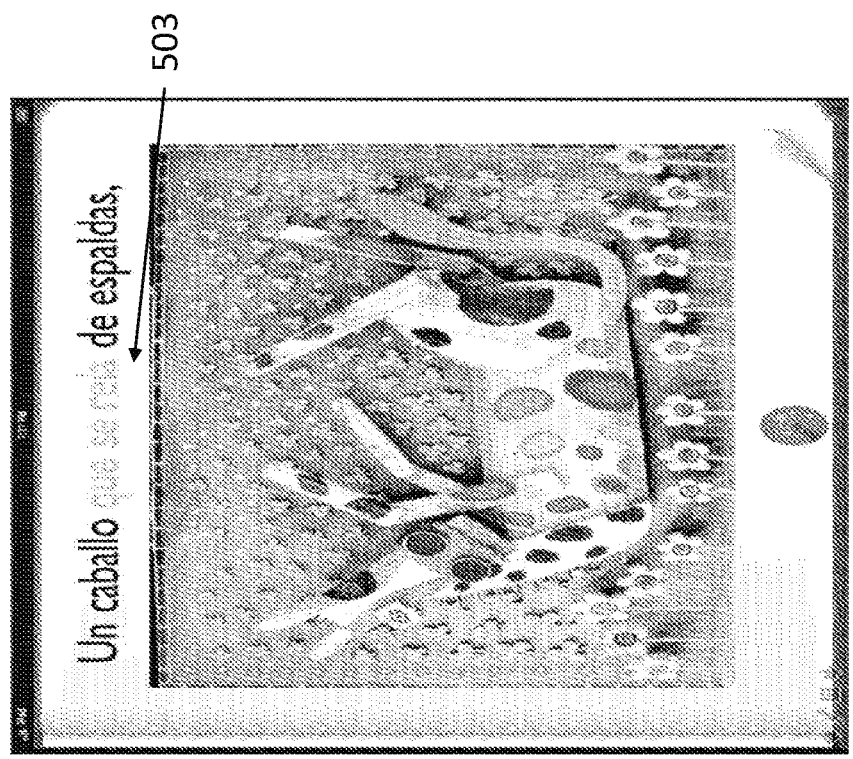
FIG. 11 shows the sixth step of progress of an embodiment of the sequential learning process applied to a digital children's story utilizing IP with iterations under NSI.

In FIG. 10, it shows that each sequential word of IP remains highlighted 503 until end of the IP and synchronized foreign language audio. As shown in FIG. 11, each sequential word of IP remains highlighted 503 until end of the IP and synchronized foreign language audio. Immediately after end of the IP, NSI audio of the IP in native language is played.

Figure 12:
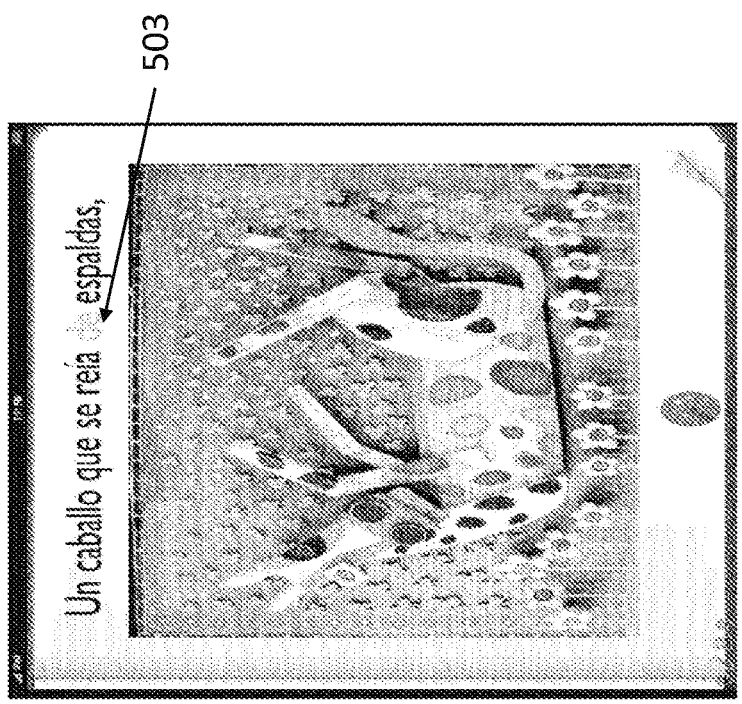
FIG. 12 shows the seventh step of progress of an embodiment of the sequential learning process applied to a digital children's story utilizing IP with iterations under NSI.
Figure 13:
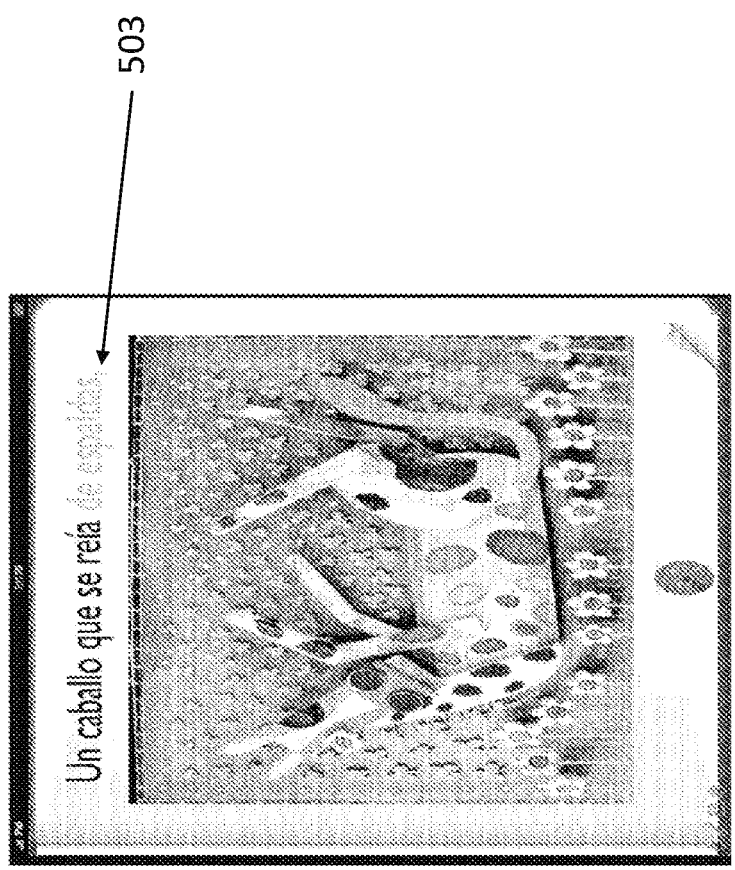
FIG. 13 shows the eighth step of progress of an embodiment of the sequential learning process applied to a digital children's story utilizing IP with iterations under NSI.
Figure 14:
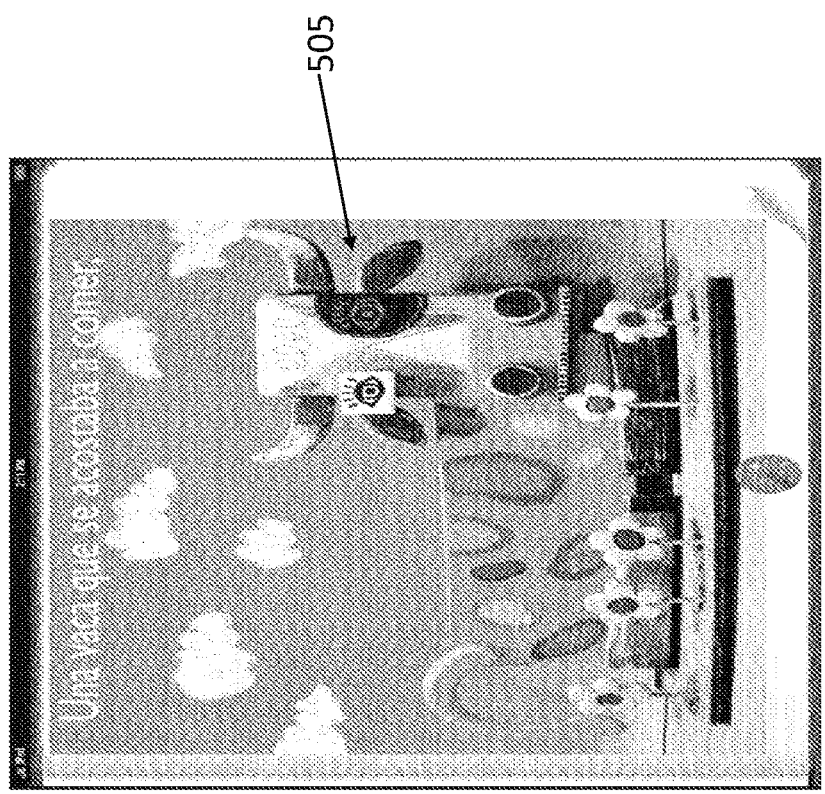
FIG. 14 shows the ninth step of progress of an embodiment of the sequential learning process applied to a digital children's story utilizing IP with iterations under NSI.

As shown in FIG. 12 the new IP begins, and each word of IP is highlighted 503 sequentially and synchronized with foreign language audio. Previous IP is no longer highlighted. As shown in FIG. 13, each sequential word of IP remains highlighted 503 until end of the IP and synchronized foreign language audio. Immediately after end of the IP, NSI audio of the IP in native language is played. In FIG. 14, the next digital page 505 is shown and the IP with NSI process repeats.

Figure 15:
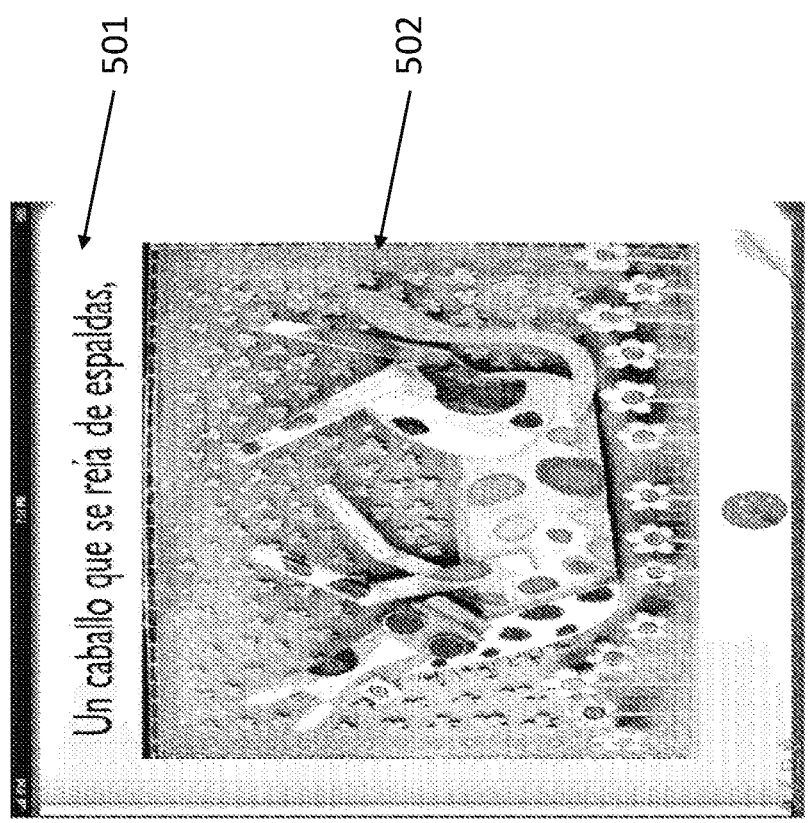
FIG. 15 shows the first step of progress of an embodiment of the sequential learning process applied to a digital children's story utilizing IP with iterations under Copycat.
Figure 16:
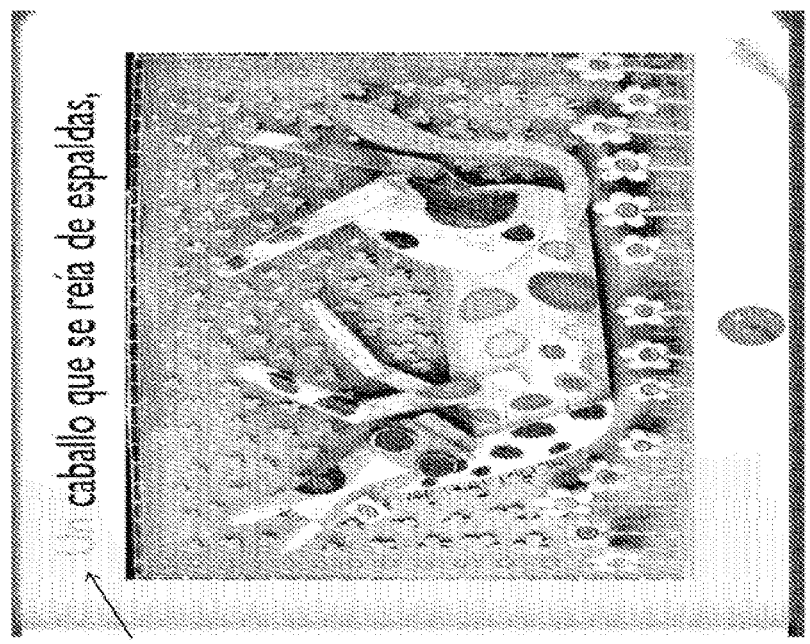
FIG. 16 shows the second step of progress of an embodiment of the sequential learning process applied to a digital children's story utilizing IP with iterations under Copycat.
Figure 17:
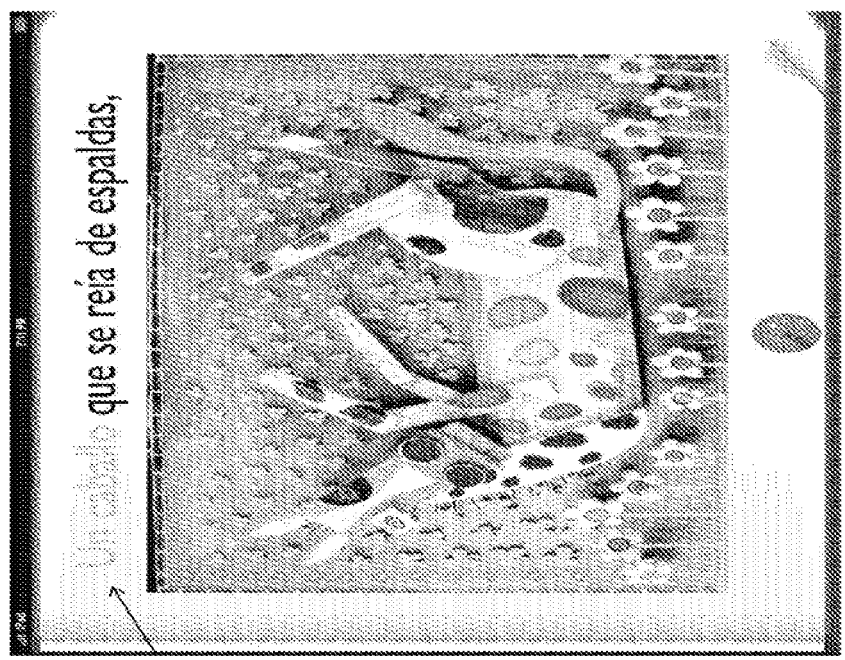
FIG. 17 shows the third step of progress of an embodiment of the sequential learning process applied to a digital children's story utilizing IP with iterations under Copycat.
Figure 18:
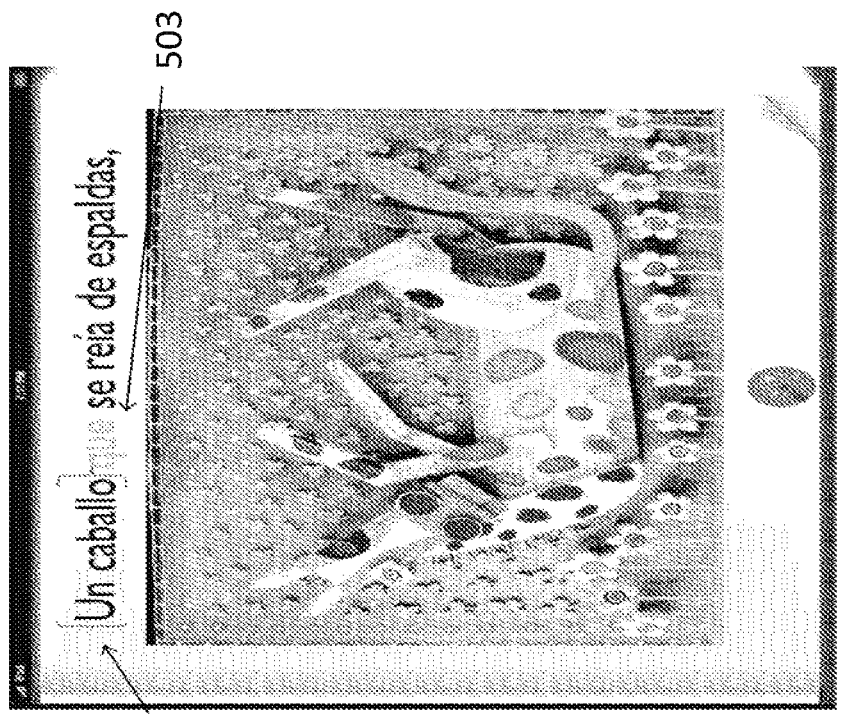
FIG. 18 shows the fourth step of progress of an embodiment of the sequential learning process applied to a digital children's story utilizing IP with iterations under Copycat.
Figure 19:
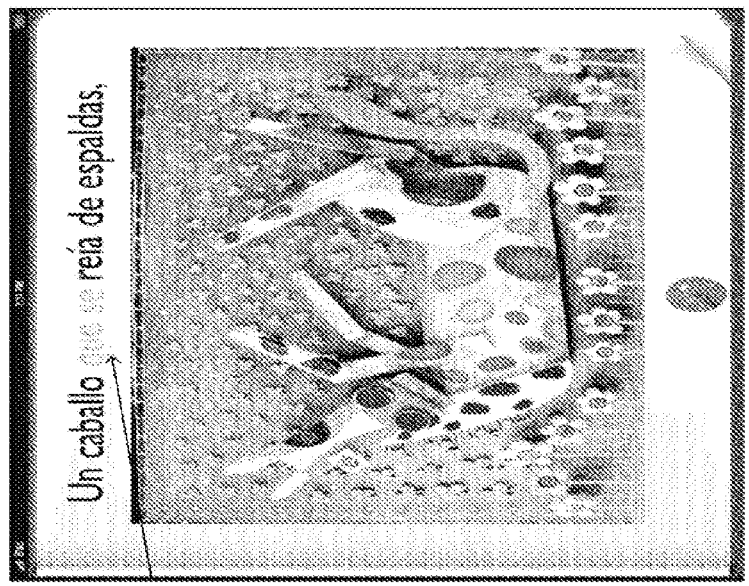
FIG. 19 shows the fifth step of progress of an embodiment of the sequential learning process applied to a digital children's story utilizing IP with iterations under Copycat.
Figure 20:
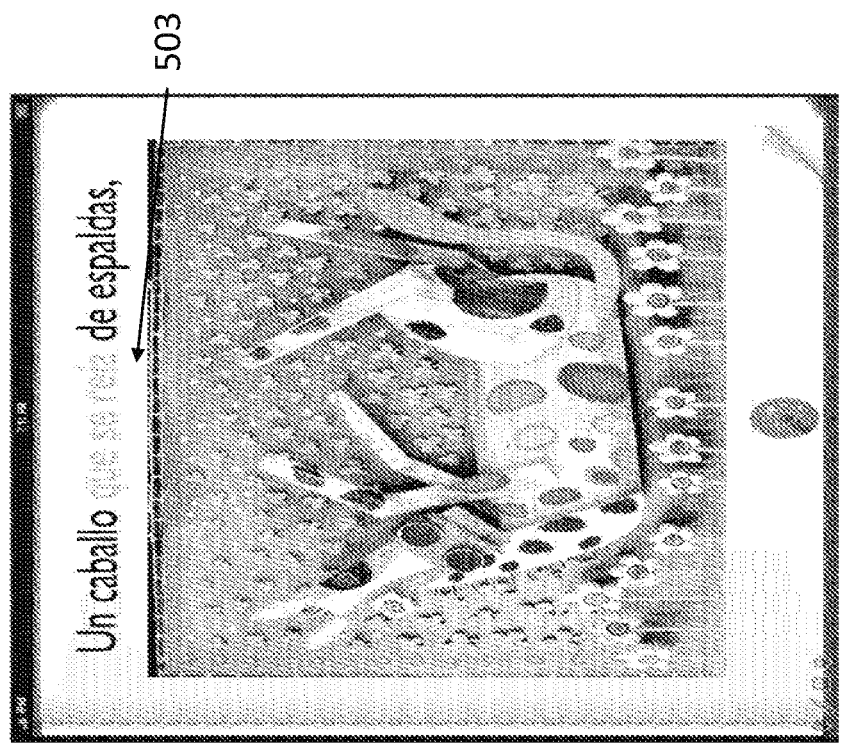
FIG. 20 shows the sixth step of progress of an embodiment of the sequential learning process applied to a digital children's story utilizing IP with iterations under Copycat.
Figure 21:
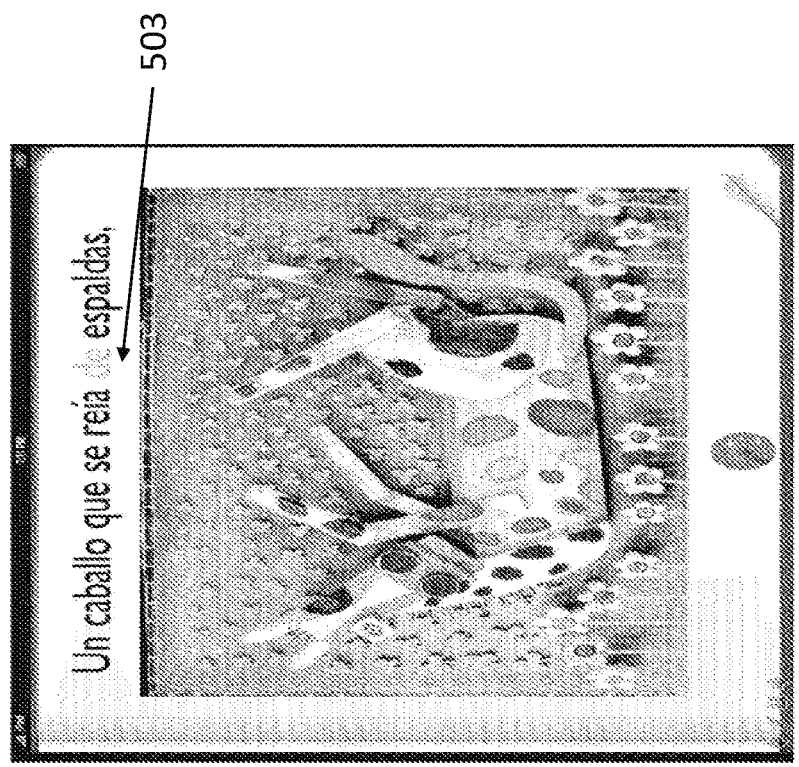
FIG. 21 shows the seventh step of progress of an embodiment of the sequential learning process applied to a digital children's story utilizing IP with iterations under Copycat.
Figure 22:
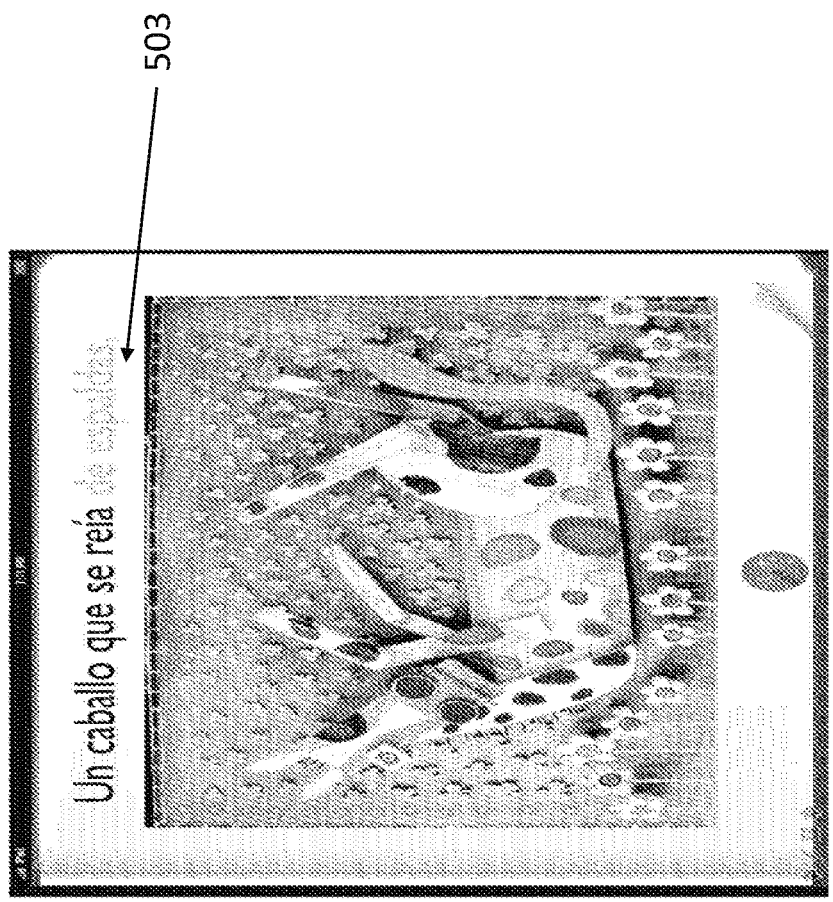
FIG. 22 shows the eighth step of progress of an embodiment of the sequential learning process applied to a digital children's story utilizing IP with iterations under Copycat.
Figure 23:
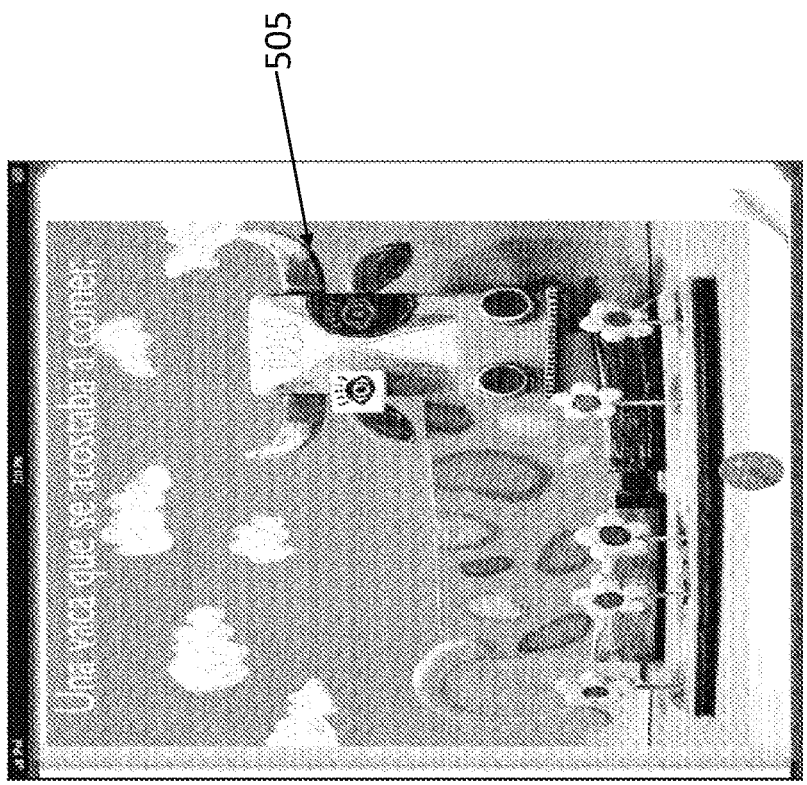
FIG. 23 shows the ninth step of progress of an embodiment of the sequential learning process applied to a digital children's story utilizing IP with iterations under Copycat.

The process can be repeated in copycat mode. In FIG. 15, first is displayed text 501 with image 502. As shown in FIG. 16, IP begins and each word of the IP is highlighted 503 sequentially and synchronized with foreign language audio. As shown in FIG. 17, each sequential word of the IP remains highlighted 503 until end of the IP and synchronized to foreign language audio. Immediately after end of the IP, child/student is cued to verbally "copycat", mimic or repeat the entire foreign language IP which is digitally recorded. As shown in FIG. 18, a new IP begins, and each word of the IP is highlighted 503 sequentially and synchronized with foreign language audio. Previous IP is no longer highlighted 504. As shown in FIG. 19, each sequential word of IP remains highlighted 503 until end of the IP and the synchronized foreign language audio. An iterative process continues. As shown in FIG. 20, the process of FIGS. 17 and 18 repeats. Each sequential word of IP remains highlighted 503 until end of the IP and the synchronized foreign language audio. Immediately after end of the IP, child/student is cued to verbally "copycat", mimic or repeat the entire foreign language IP which is digitally recorded and new IP begins, and each word of IP is highlighted 503 sequentially and synchronized with foreign language audio. The previous IP is no longer highlighted 504. The process is repeated until FIG. 23 is reached and the program changes to the next digital page 505 and the IP with copycat process repeats.

Figure 24:
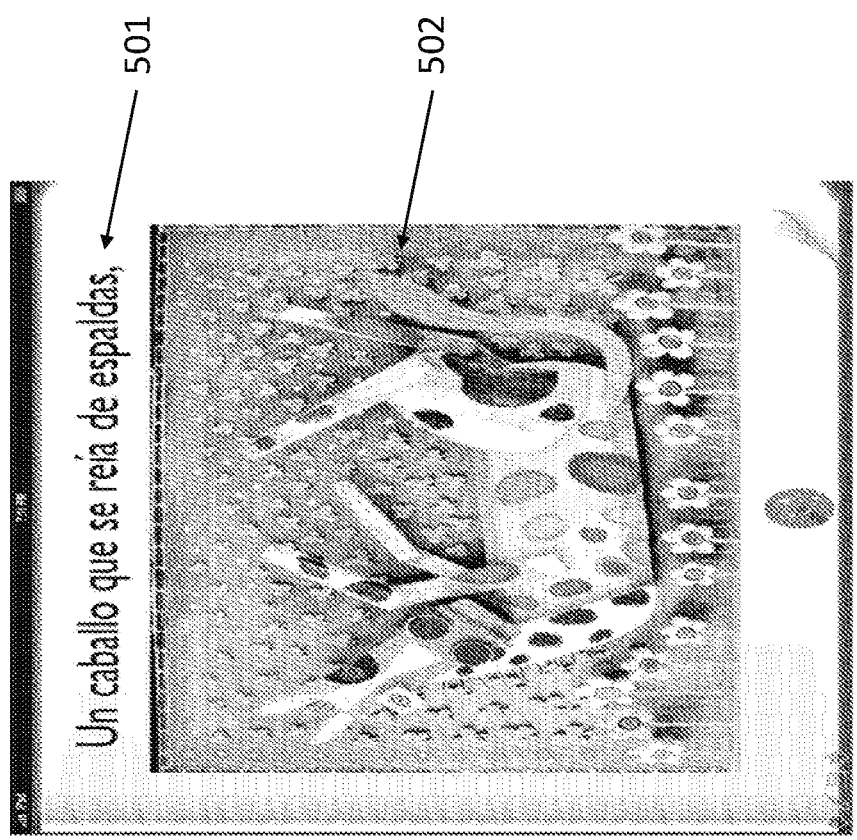
FIG. 24 shows the first step of progress of an embodiment of the sequential learning process applied to a digital children's story utilizing IP with iterations under Read by Myself (RBM) methodology.
Figure 25:
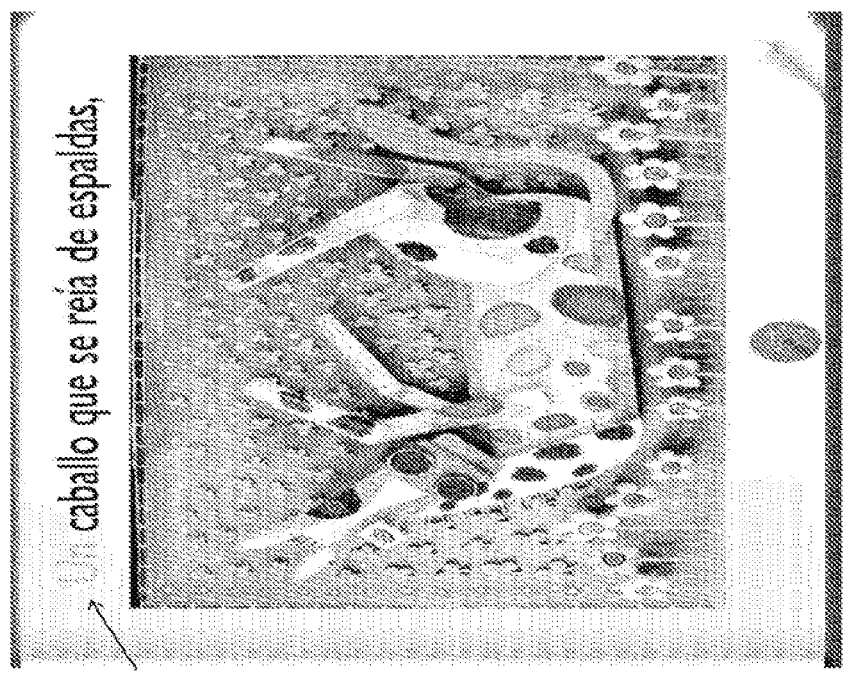
FIG. 25 shows the second step of progress of an embodiment of the sequential learning process applied to a digital children's story utilizing IP with iterations under RBM.
Figure 26:
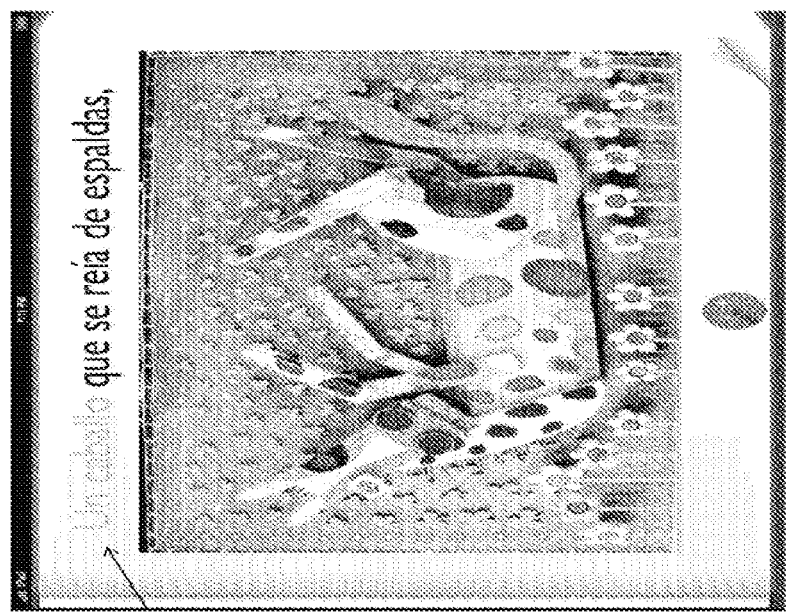
FIG. 26 shows the third step of progress of an embodiment of the sequential learning process applied to a digital children's story utilizing IP with iterations under RBM.
Figure 27:
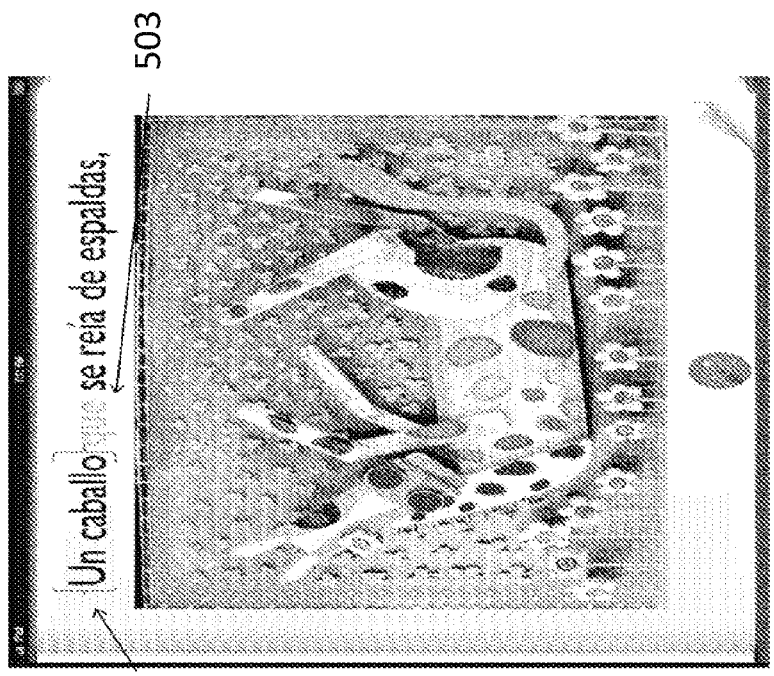
FIG. 27 shows the fourth step of progress of an embodiment of the sequential learning process applied to a digital children's story utilizing IP with iterations under RBM.
Figure 28:
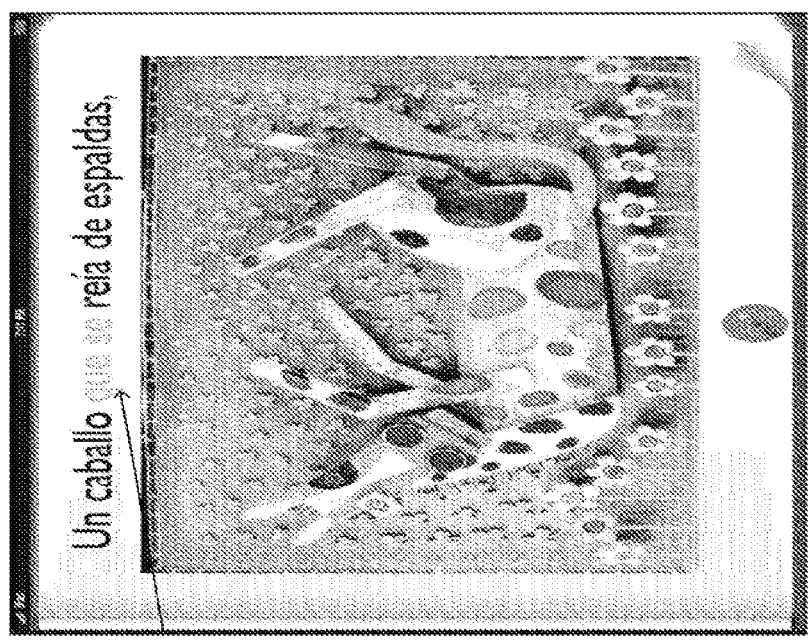
FIG. 28 shows the fifth step of progress of an embodiment of the sequential learning process applied to a digital children's story utilizing IP with iterations under RBM.
Figure 29:
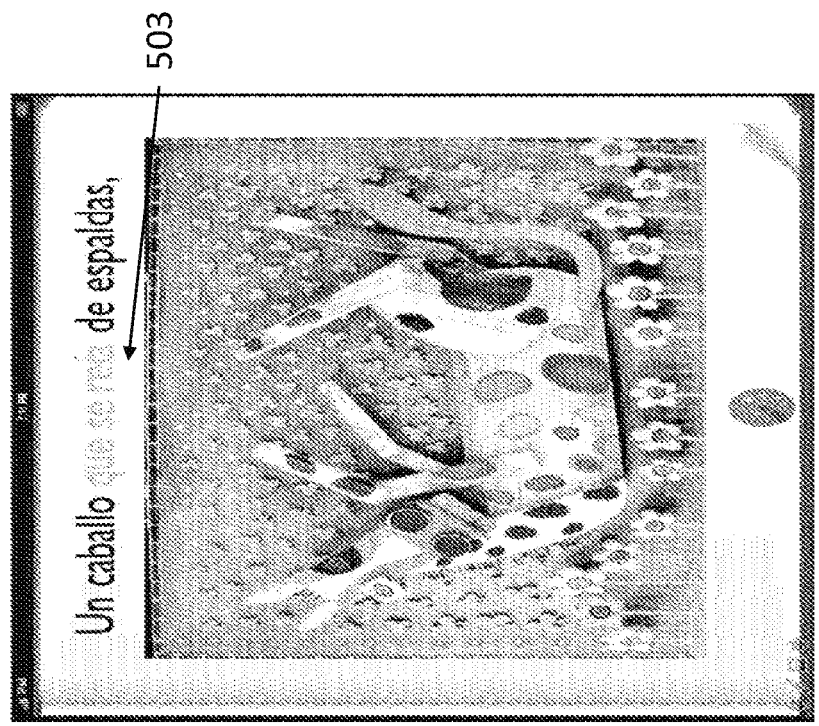
FIG. 29 shows the sixth step of progress of an embodiment of the sequential learning process applied to a digital children's story utilizing IP with iterations under RBM.
Figure 30:
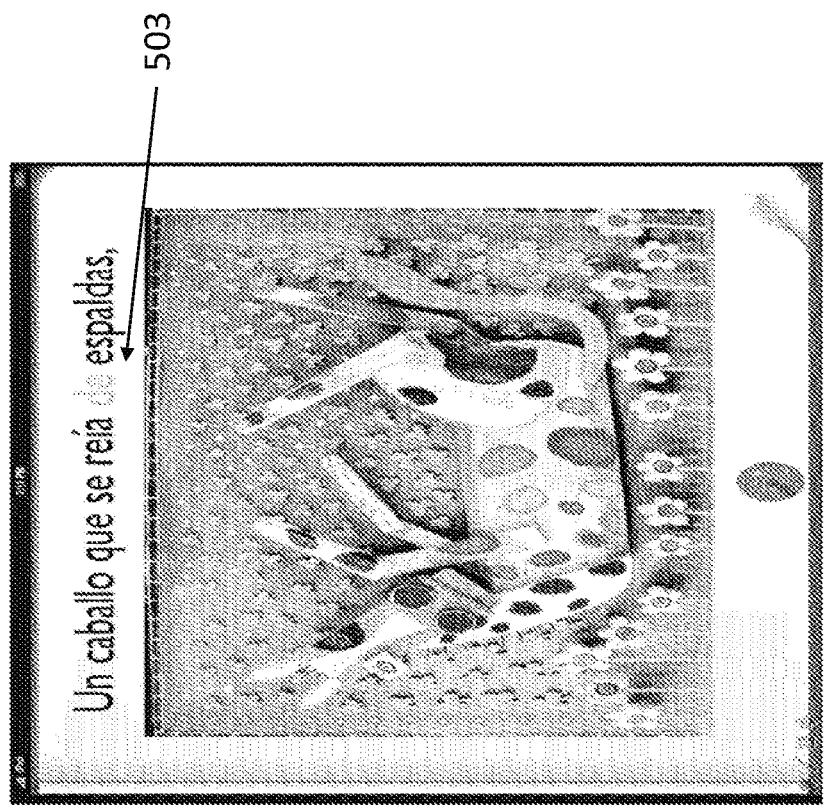
FIG. 30 shows the seventh step of progress of an embodiment of the sequential learning process applied to a digital children's story utilizing IP with iterations under RBM.
Figure 31:
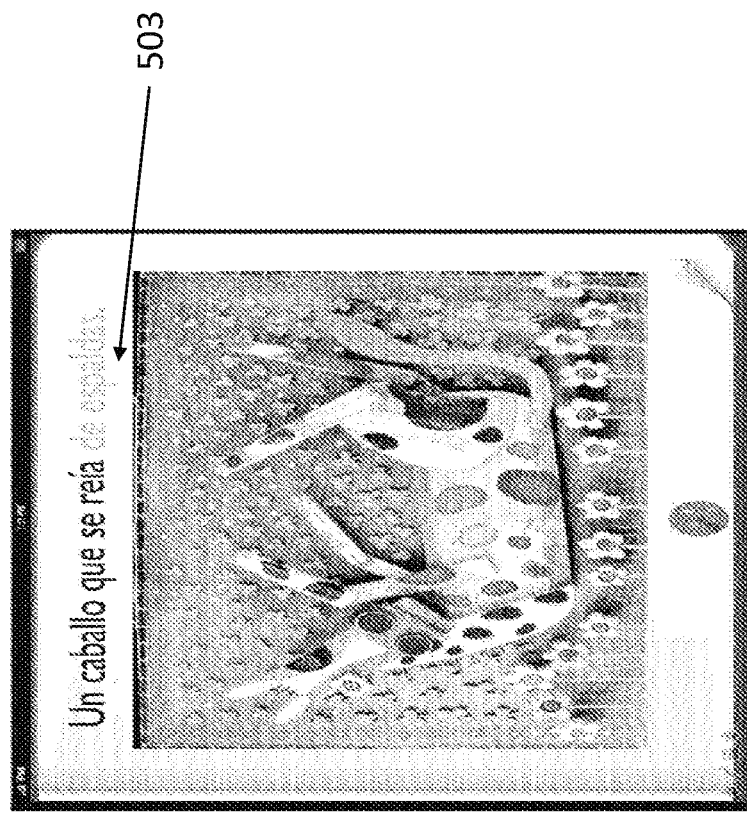
FIG. 31 shows the eighth step of progress of an embodiment of the sequential learning process applied to a digital children's story utilizing IP with iterations under RBM.

The process shown in FIG. 24-32 can be repeated in the Read By Myself embodiment. As shown in FIG. 24, the text 501 and image 502 is displayed. Next, as shown in FIG. 25, the IP begins and each word of IP is highlighted 503 sequentially. As shown in FIG. 26, each sequential word of IP remains highlighted 503 until end of the IP. Immediately after end of the IP, child/student is cued to verbalize, or "read by myself" (RBM) out loud, the entire foreign language IP which is digitally recorded. Then, as shown in FIG. 27, a new IP begins, and each word of IP is highlighted 503 sequentially. The previous IP is no longer highlighted 504. As shown in FIG. 28, each sequential word of IP remains highlighted 503 until end of the IP. The process repeats as shown in FIG. 29-31. Each sequential word of IP remains highlighted 503 until end of the IP. Immediately after end of the IP, child/student is cued to verbalize, or RBM out loud, the entire foreign language IP which is digitally recorded. Then new IP begins, and each word of IP is highlighted 503 sequentially.

Figure 32:
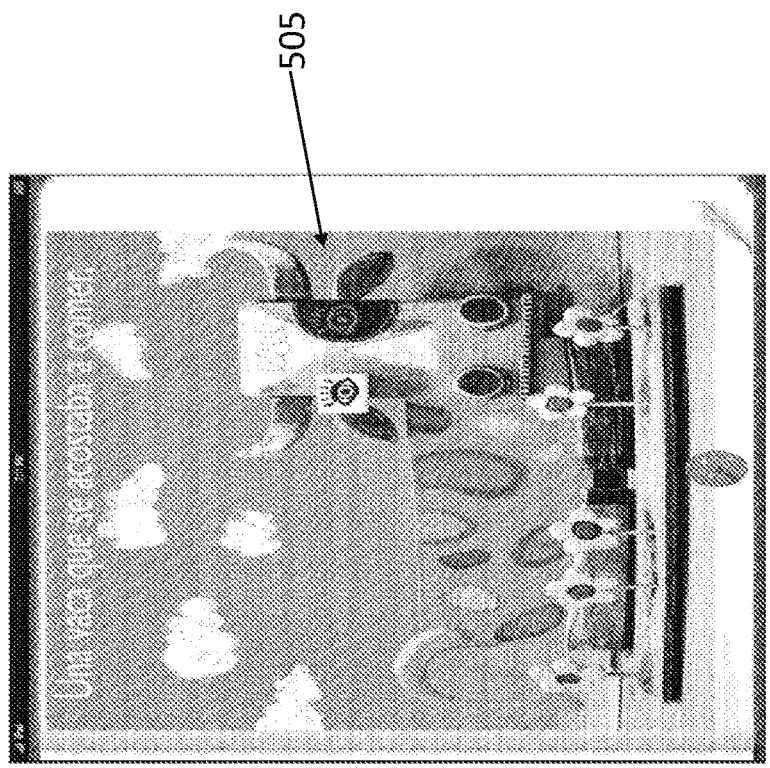
FIG. 32 shows the ninth step of progress of an embodiment of the sequential learning process applied to a digital children's story utilizing IP with iterations under RBM.

The previous IP is no longer highlighted 504. Then each sequential word of IP remains highlighted 503 until end of the IP. Immediately after end of the IP, child/student is cued to verbalize, or RBM out loud, the entire foreign language IP which is digitally recorded. Finally, as shown in FIG. 32, the program switches to the next digital page 505 and the IP with RBM process repeats.

With respect to newly added texts and modules, in some embodiments it is necessary to access outside language tools, including natural language processing (NLP), machine learning, and machine translation. In the preferred embodiment, NLP and machine learning software and associated hardware and transmission ability are third-party owned or developed devices. Through any type of interconnectivity, e.g., an internet connection to NLP and machine learning software, a text can be added to the system in either the target foreign language or the user's primary language. Utilizing natural language processing and machine translation, a text can be translated and both versions can be subject to the interpretive phrase processes described elsewhere herein. As used herein, machine translation can include any variety of process of automated or partially automated processes that can input a text in written form and produce output of the same text in a different language, including machine-aided human translation, computer aided translation, and interactive translation.

Figure 33:
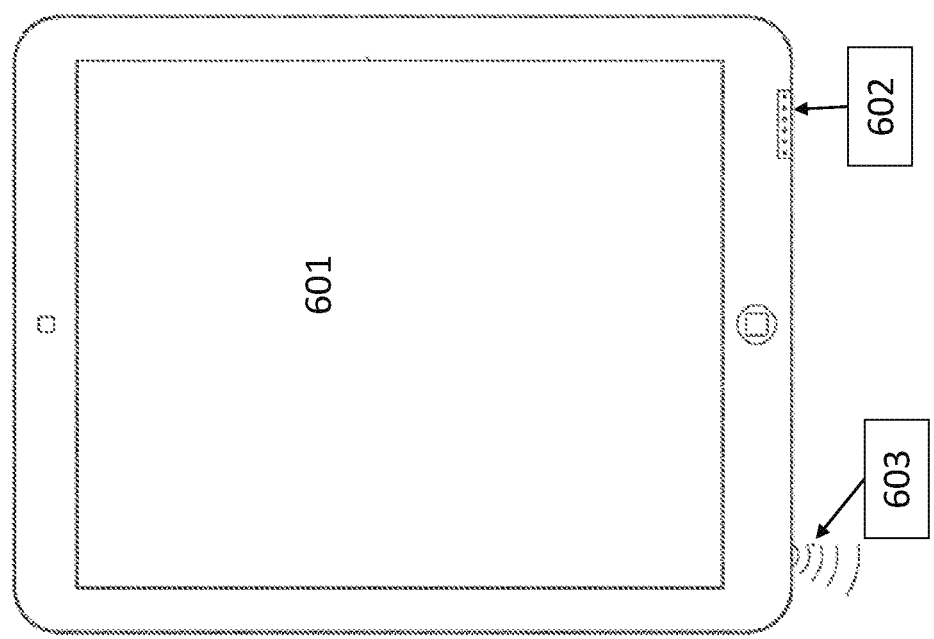
FIG. 33 is an exemplary mobile computing device on which the teachings of this disclosure can be utilized.

As shown in FIGS. 1 and 33 where like numbers represent like devices, the teachings of the present disclosure can be implemented on a mobile computing device 102. The text and images appear on the screen 601. The computing device 102 can have a microphone 602 and a speaker 603 for input and output from the student, respectively.

Figure 34:
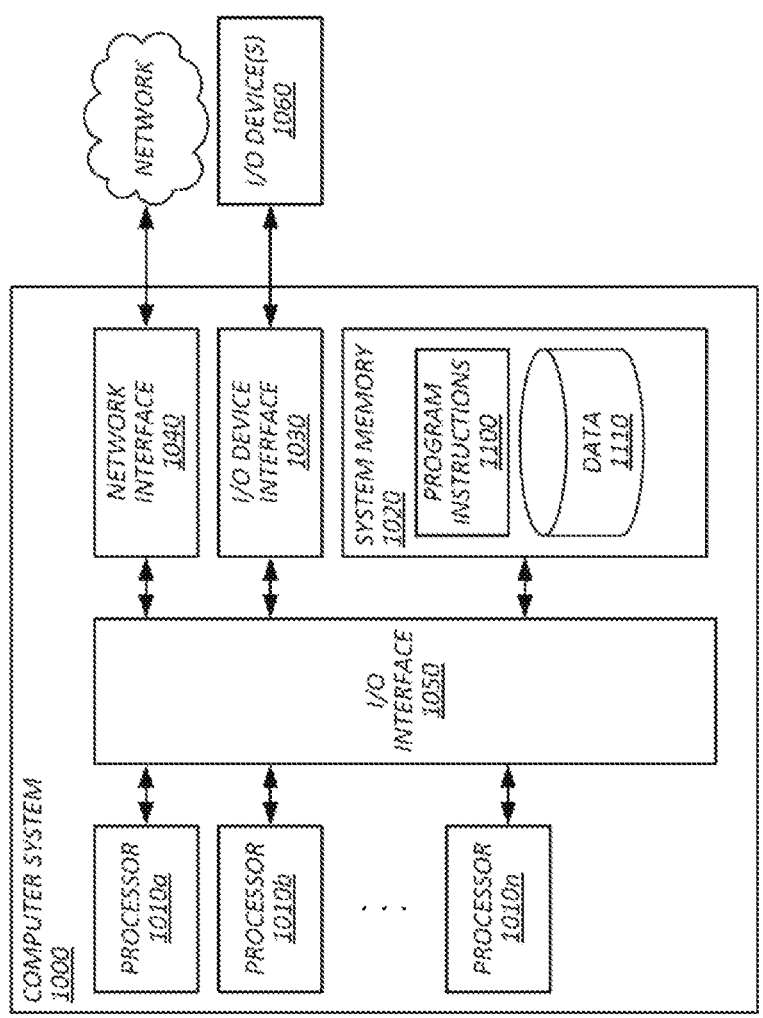
FIG. 34 is a representation of an exemplary computer system on which the methods taught herein can be utilized.

With respect to FIG. 34, computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. It should be understood that any usage of words where a generic descriptor is used and the specific examples follow (for example, when a word or phrase is followed by "such as", "including but not limited to" "e.g." and one or more examples) the absence of such phrase elsewhere should not be interpreted to mean the opposite, that is, the absence of verbiage indicating something "is not limited to" a particular set of examples should not be interpreted to mean that that the embodiment is limited to the specific examples unless wording is included specifically indicating such limitation. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

In this patent, to the extent certain U.S. patents, U.S. patent applications, or other materials (e.g., articles) have been incorporated by reference, the text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

Some aspects of the present disclosure include a non-transitory computer-readable medium having computer-executable instructions stored thereon which, when executed by one or more processors effectuate operations comprising, dividing a text of a plurality of words in a foreign language into one or more Interpretation Phrases (IP), each of the said Interpretation Phrases (IP) being made of one or more words chosen at an optimal composition for a child to listen to, read along, and maintain comprehension and engagement, wherein the optimal composition is determined based on the biographical data of the child and the historical usage by the child; reading aloud the first Interpretation Phrase (IP) by a narrator; and after reading aloud the first Interpretation Phrase, interpreting aloud the first Interpretation Phrase into the said child's native language to provide understanding of the Interpretation Phrase in the child's native language, to maintain the flow of the story, and to create and promote subconscious associations between native and foreign language words.

Some aspects of the present disclosure include the non-transitory computer-readable medium having computer-executable instructions above wherein the reading aloud step and the interpreting aloud step are performed by a mobile digital platform.

The non-transitory computer-readable medium having computer-executable instructions of the prior paragraph(s), wherein executed by one or more processors further effectuate operations comprising the steps of highlighting a word of the text sequentially as the narrator reads aloud the Interpretation Phrases (IP) in the foreign language; keeping the word highlighted as a subsequent word in the Interpretation Phrase (IP) is read until an entire Interpretation Phrase (IP) becomes highlighted; keeping the Interpretation Phrase (IP) highlighted during the interpretation step to indicate said Interpretation Phrase (IP) is what is currently being interpreted; switching off all highlighting of the Interpretation Phrase (IP) after the interpretation step.

Some aspects of the present disclosure include the non-transitory computer-readable medium having computer-executable instructions of the above paragraph(s), wherein executed by one or more processors further effectuate operations comprising the steps of highlighting a syllable of the text sequentially as the narrator reads aloud each of the Interpretation Phrases (IP) in the foreign language; keeping the syllable highlighted as a subsequent syllable in the Interpretation Phrase (IP) is read until an entire Interpretation Phrase (IP) becomes highlighted; keeping the Interpretation Phrase (IP) highlighted during the translation step to indicate said Interpretation Phrase (IP) is what is currently being interpreted; switching off all highlighting at the end of the translation step and reading the next Interpretation Phrase (IP) in the foreign language.

Some aspects of the present disclosure include the non-transitory computer-readable medium having computer-executable instructions of the above paragraph(s), wherein the steps of reading, interpreting, highlighting, keeping the word highlighted, keeping the Interpretation Phrase (IP) highlighted, and switching off all highlighting are repeated until the text is completed.

Some aspects of the present disclosure include the non-transitory computer-readable medium having computer-executable instructions of the above paragraph(s), wherein executed by one or more processors further effectuate operations comprising the step of algorithmically determining the composition of an Interpretation Phrase (IP), and the steps of dividing, reading, interpreting, highlighting, keeping the word highlighted, keeping the Interpretation Phrase (IP) highlighted, and switching off all highlighting are repeated until the text is completed.

Some aspects of the present disclosure include the non-transitory computer-readable medium having computer-executable instructions of the above paragraphs, wherein each Interpretation Phrase (IP) is a single word.

Some aspects of the present disclosure include the non-transitory computer-readable medium having computer-executable instructions of the above paragraph(s), wherein executed by one or more processors further effectuate operations comprising a copycat method, comprising reading aloud an Interpretation Phrase (IP) by the narrator; highlighting the Interpretation Phrase (IP); instructing a child to mimic, or "copycat" the tone of voice, volume, and accent of the narrator after the Interpretation Phrase (IP).

Some aspects of the present disclosure include the non-transitory computer-readable medium having computer-executable instructions of the above paragraph(s), wherein executed by one or more processors further effectuate operations comprising the step of recording the narrator and child's voice mimicking the narrator is recorded as an audio file available for playback.

Some aspects of the present disclosure include the non-transitory computer-readable medium having computer-executable instructions of the above paragraph, wherein executed by one or more processors further effectuate operations comprising a narratorless method, comprising presenting a foreign language text to a child to be read aloud sequentially highlighted Interpretation Phrases (IP) without an audio file of a narrator reading aloud the text.

Some aspects of the present disclosure include the non-transitory computer-readable medium having computer-executable instructions of the above paragraph(s), wherein executed by one or more processors further effectuate operations comprising storing digitally the child's voice; and making the digitally stored child's voice available for playback.

Some aspects of the present disclosure include the non-transitory computer-readable medium having computer-executable instructions of the above paragraph(s), wherein executed by one or more processors further effectuate operations comprising providing access to a family associated with the child to an account; providing the child a user profile such that a third party has the option to access usage analysis and insight into their child's usage patterns.

Some aspects of the present disclosure include the non-transitory computer-readable medium having computer-executable instructions of the above paragraph(s), wherein executed by one or more processors further effectuate operations comprising allowing a plurality of settings to be altered for a child; providing default recommended settings for an average beginner; allowing for adjustment and tailoring to the child as the child adapts to the child's language adoption.

Some aspects of the present disclosure include a children's language learning system, comprising: a computing device having a general user interface and a central processing unit; non-transient media playable on the computing device, comprising: a plurality of audio files with a plurality of portions, at least one portion being a known language portion and one portion being a translation into foreign language portion, wherein the translation into foreign language portion is grouped into Interpretive Phrases (IP); and a plurality of image files comprising foreign language text accessible synchronously with the plurality of audio files, wherein an image file is displayed concurrently with a foreign language portion and before the known language portion.

Some aspects of the present disclosure include the system of the above paragraph wherein the composition of Interpretation Phrases (IP) is determined algorithmically based on one or more of demographic data and historical use.

Some aspects of the present disclosure include the system of the above paragraph(s) wherein the image file further comprises highlighted text and unhighlighted text, and the audio file is synchronously related to the image file such that as the audio file recites a word, an unhighlighted text changes to a highlighted text corresponding to the word.

Some aspects of the present disclosure include the system of the above paragraph(s) further comprising a copycat mode, wherein foreign words are read aloud and a user is instructed to mimic the foreign words read aloud.

Some aspects of the present disclosure include the system of the above paragraph(s) wherein sound created by the user's mimic of the foreign words read aloud is stored locally on a mobile computing device and accessible for playback.

Some aspects of the present disclosure include the system of the above paragraph(s) wherein at least three of the portions comprise Interpretation Phrases (IP) of the same foreign language words grouped in different compositions with some compositions being algorithmically determined to be suitable for a plurality of levels of learners.

Some aspects of the present disclosure include the system of the above paragraph(s) wherein Interpretation Phrases of at least one of the plurality of levels of learners are accessible to users algorithmically determined to be of more advanced language skills and at least one of the plurality of levels of Interpretation Phrases are accessible to users algorithmically determined to be of less advanced language skills, such algorithmic determination of language skills based on one or more of demographic data and historical use.

I claim:

1. A non-transitory computer-readable medium having computer-executable instructions stored thereon which, when executed by one or more processors effectuate operations comprising:
    causing, by a computer system, display of text on a graphical user interface on a device of a user;
    obtaining, with the computer system via a camera coupled to the computer system and when causing the display of text on the graphical user interface on the device of the user, eye movement of the user;
    determining, with the computer system, a user speed of the user going through the text on the graphical user interface from the eye movement;
    retrieving, with the computer system, an ability score of the user, wherein the ability score is determined based on at least the user speed;
    dividing, with the computer system, the text in a first language into a plurality of Interpretation Phrases for the user, wherein for each respective Interpretation Phrase of the plurality of Interpretation Phrases the dividing includes:
        generating, with the computer system, a plurality of subdivisions of the text, wherein at least one subdivision of the plurality of subdivisions shares a word with another subdivision of the plurality of subdivisions and are generated based on a combination of a grammatical construct and a length satisfying a flow condition related to a corresponding audio interpretation of the text; and determining, with the computer system, a plurality of scores based on the plurality of subdivisions, wherein each respective score corresponds with a respective subdivision of the plurality of subdivisions, and wherein determining the respective score comprises counting a number of words of the respective subdivision;

determining, with the computer system, the respective Interpretation Phrase based on a selected subdivision, wherein the respective score of the selected subdivision corresponds with the ability score of the user, wherein the ability score is based on a historical usage value of the user;

obtaining, with the computer system, a first audio file of a dictation of a first Interpretation Phrase of the plurality of Interpretation Phrases using a processor of the computer system;

obtaining, with the computer system, a second audio file of a second dictation based on an interpretation of the first Interpretation Phrase using a cloud-based service, wherein the second audio file is in a second language and the second audio file includes the audio interpretation of the text;

playing the first audio file, at the device while sequentially highlighting a set of words of the first Interpretation Phrase in a graphical user interface while the first audio file is being read in the first language;

playing, with the computer system, the second audio file at the device after playing the first audio file, wherein the first Interpretation Phrase remains highlighted during the playing of the second audio file; and in accordance with a determination that the first and the second audio files have played, removing the highlighting of the first Interpretation Phrase.

2. The non-transitory computer-readable medium of claim 1, wherein playing the first audio file comprises playing the first audio file using a mobile digital platform, and wherein playing the second audio file comprises playing the second audio file using the mobile digital platform.

3. The non-transitory computer-readable medium of claim 1, wherein the set of Interpretation Phrases comprises all the words of the plurality of words, and wherein obtaining the second audio file comprises obtaining an audio file in the second language for each phrase of the set of Interpretation Phrases, and wherein playing the second audio file comprises playing an audio file for each phrase of the set of Interpretation Phrases.

4. The non-transitory computer-readable medium of claim 1, wherein each Interpretation Phrase of the set of Interpretation Phrases is a single word.

5. The non-transitory computer-readable medium of claim 1, the operations further comprising:
recording a voice of the user for a third audio file; and
combining the first audio file and the third audio file into a combined audio file available for playback.

6. The non-transitory computer-readable medium of claim 1, the operations further comprising:
sequentially highlighting Interpretation Phrases on the graphical user interface without an audio file of a narrator reading aloud the text.

7. The non-transitory computer-readable medium of claim 1, the operations further comprising:
storing a recording of a vocal recitation provided by the user; and
making the recording available for playback.

8. The non-transitory computer-readable medium of claim 1, wherein the user is a first user, the operations further comprising providing the first user with a user profile comprising the historical usage value wherein the historical usage value is accessible to a second user.

9. The non-transitory computer-readable medium of claim 1, the operations further comprising:
providing default recommended settings for a plurality of settings associated with the user;
adjusting at least one setting of the plurality of settings of the user as the historical usage value is updated.

10. The non-transitory computer-readable medium of claim 1, the operations further comprising determining the ability score based on an age of the user.

11. A method comprising:
causing, by a computer system, display of text on a graphical user interface on a device of a user;
obtaining, with the computer system via a camera coupled to the computer system and when causing the display of text on the graphical user interface on the device of the user, eye movement of the user;
determining, with the computer system, a user speed of the user going through the text on the graphical user interface from the eye movement retrieving, with the computer system, an ability score of the user, wherein the ability score is determined based on at least the user speed;
dividing, with the computer system, the text in a first language into a plurality of Interpretation Phrases for the user, wherein for each respective Interpretation Phrase of the plurality of Interpretation Phrases the dividing includes:
generating, with the computer system, a plurality of subdivisions of the text, wherein at least one subdivision of the plurality of subdivisions shares a word with another subdivision of the plurality of subdivisions and are generated based on a combination of a grammatical construct and a length satisfying a flow condition related to a corresponding audio interpretation of the text; and
determining, with the computer system, a plurality of scores based on the plurality of subdivisions, wherein each respective score corresponds with a respective subdivision of the plurality of subdivisions, and wherein determining the respective score comprises counting a number of words of the respective subdivision;
determining, with the computer system, the respective Interpretation Phrase based on a selected subdivision, wherein the respective score of the selected subdivision corresponds with the ability score of the user, wherein the ability score is based on a historical usage value of the user;
obtaining, with the computer system, a first audio file of a dictation of a first Interpretation Phrase of the plurality of Interpretation Phrases in the first language;
obtaining, with the computer system, a second audio file of a second dictation of the first Interpretation Phrase, wherein the second audio file is in a second language distinct from the first language and the second audio file includes the audio interpretation of the text;
playing the first audio file, at the device while sequentially highlighting a set of words of the text corresponding to words of the first Interpretation Phrase in a graphical user interface;
playing, with the computer system, the second audio file at the device after playing the first audio file, wherein the first Interpretation Phrase remains highlighted during the playing of the second audio file; and in accordance with a determination the first and second audio files have played, removing the highlighting of the first Interpretation Phrase.

12. A non-transitory computer-readable medium having computer-executable instructions stored thereon which, when executed by one or more processors effectuate operations comprising:

causing, by a computer system, display of text on a graphical user interface on a device of a user;

obtaining, with the computer system via a camera coupled to the computer system and when causing the display of text on the graphical user interface on the device of the user, eye movement of the user;

determining, with the computer system, a user speed of the user going through the text on the graphical user interface from the eye movement;

retrieving, with the computer system, an ability score of the user, wherein the ability score is determined based on at least the user speed;

dividing, with the computer system, the text in a first language into a plurality of Interpretation Phrases for the user, wherein for each respective Interpretation Phrase of the plurality of Interpretation Phrases the dividing includes:

generating, with the computer system, a plurality of subdivisions of the text, wherein at least one subdivision of the plurality of subdivisions shares a word with another subdivision of the plurality of subdivisions and are generated based on a combination of a grammatical construct and a length satisfying a flow condition related to a corresponding audio interpretation of the text; and determining, with the computer system, a plurality of scores based on the plurality of subdivisions, wherein each respective score corresponds with a respective subdivision of the plurality of subdivisions, and wherein determining the respective score comprises counting a number of words of the respective subdivision;

determining, with the computer system, the respective Interpretation Phrase based on a selected subdivision, wherein the respective score of the selected subdivision corresponds with the ability score of the user, wherein the ability score is based on a historical usage value of the user;

obtaining, with the computer system, a first audio file of a dictation of a first Interpretation Phrase of the plurality of Interpretation Phrases in the first language;

obtaining, with the computer system, a second audio file of a second dictation of the first Interpretation Phrase, wherein the second audio file is in a second language distinct from the first language and the second audio file includes the audio interpretation of the text;

playing the first audio file, at the device while sequentially highlighting a set of words of the text corresponding to words of the first Interpretation Phrase in a graphical user interface;

playing, with the computer system, the second audio file at the device after playing the first audio file, wherein the first Interpretation Phrase remains highlighted during the playing of the second audio file; and in accordance with a determination the first and second audio files have played, removing the highlighting of the first Interpretation Phrase.

13. The non-transitory computer-readable medium of claim 12, wherein playing the first audio file comprises playing the first audio file using a mobile digital platform, and wherein playing the second audio file comprises playing the second audio file using the mobile digital platform.

14. The non-transitory computer-readable medium having computer-executable instructions of claim 12, wherein the set of Interpretation Phrases comprises all the words of the plurality of words, and wherein obtaining the second audio file comprises obtaining an audio file in the second language for each phrase of the set of Interpretation Phrases, and wherein playing the second audio file comprises playing an audio file for each phrase of the set of Interpretation Phrases.

15. The non-transitory computer-readable medium having computer-executable instructions of claim 12, wherein each Interpretation Phrase of the set of Interpretation Phrases is a single word.

16. The non-transitory computer-readable medium having computer-executable instructions of claim 12, the operations further comprising:

recording a voice of the user for a third audio file; and combining the first audio file and the third audio file into a combined audio file available for playback.

17. The non-transitory computer-readable medium having computer-executable instructions of claim 12, the operations further comprising:

sequentially highlighting Interpretation Phrases on the graphical user interface without an audio file of a narrator reading aloud the text.

18. The non-transitory computer-readable medium having computer-executable instructions of claim 12, the operations further comprising:

storing a recording of a vocal recitation provided by the user; and making the recording available for playback.

19. The non-transitory computer-readable medium having computer-executable instructions of claim 12, wherein the user is a first user, the operations further comprising providing the first user with a user profile comprising the historical usage value wherein the historical usage value is accessible to a second user.

20. The non-transitory computer-readable medium having computer-executable instructions of claim 12, the operations further comprising:

providing default recommended settings for a plurality of settings associated with the user;

adjusting at least one setting of the plurality of settings of the user as the historical usage value is updated.

\* \* \* \* \*